United States Patent [19]

Nishizawa et al.

[11] Patent Number: 5,587,792
[45] Date of Patent: Dec. 24, 1996

[54] APPARATUS AND METHOD FOR MEASURING THICKNESS OF THIN SEMICONDUCTOR MULTI-LAYER FILM

[76] Inventors: Seiji Nishizawa, 1919-8, Hane, Hamura-shi, Tokyo; Tokuji Takahashi, 1 Ban 5-1206, Toyosato 2-chome, Higashiyodogawa-ku Osaka-shi, Osaka; Ryo Hattori, c/o Mitsubishi Denki Kabushiki Kaisha, Hikari Micro-ha Device Kenkyusho, 1 Mizuhara 4-chome, Itami-shi, Hyogo 664, all of Japan

[21] Appl. No.: 541,040

[22] Filed: Oct. 11, 1995

Related U.S. Application Data

[62] Division of Ser. No. 262,840, Jun. 21, 1994.

[30] Foreign Application Priority Data

Jun. 21, 1993 [JP] Japan .................................. 5-148839

[51] Int. Cl.⁶ ...................................................... G01B 9/02
[52] U.S. Cl. .......................... 355/356; 356/346; 356/357; 356/361; 250/559.27
[58] Field of Search .................................. 356/355, 357, 356/346, 361; 250/559.27

[56] References Cited

U.S. PATENT DOCUMENTS

| | | | |
|---|---|---|---|
| 4,555,767 | 11/1985 | Case et al. | 356/257 |
| 4,707,611 | 11/1987 | Southwell | 356/382 |
| 4,999,508 | 3/1991 | Hyakumura | 356/382 |
| 5,100,233 | 3/1992 | Southwell et al. | 356/382 |
| 5,227,861 | 7/1993 | Nishizawa et al. | 356/382 |
| 5,371,596 | 12/1994 | Hattori et al. | 356/382 |
| 5,414,506 | 5/1995 | Saisho et al. | 356/382 |
| 5,440,141 | 8/1995 | Horie | 356/357 |
| 5,491,551 | 2/1996 | Mattsoy | 356/346 |

FOREIGN PATENT DOCUMENTS

| | | |
|---|---|---|
| 0420113 | 4/1991 | European Pat. Off. . |
| 3110405 | 5/1991 | Japan . |
| 466806 | 3/1992 | Japan . |
| 5302816 | 11/1993 | Japan . |

OTHER PUBLICATIONS

Case et al., "Transparent Film Thickness Measurement", IBM Technical Disclosure Bulletin, vol. 24, No. 1A, Jun. 1981, pp. 49–54.

"Film Thickness Mapping System", Solid State Technology, vol. 34, 1991, pp. 57 and 59.

*Primary Examiner*—Frank Gonzalez
*Assistant Examiner*—Jason D. Eisenberg

[57] ABSTRACT

An interference waveform dispersion spectrum of light reflected from a multi-layer film is compared to a waveform obtained by numerical calculation using an optical characteristic matrix. Respective layer thickness values obtained from the calculated analysis of the Spatial interference waveform are subjected to waveform fitting with actually measured values. The theoretical interference spectrum is recalculated while changing approximate values of the layer thicknesses until a match is obtained to obtain precise respective layer thicknesses. The thicknesses of respective layers of a thin multi-layer film of submicron thicknesses can be non-destructively measured exactly and stably without direct contact.

6 Claims, 17 Drawing Sheets from the light collecting mirror 30 from the light collecting mirror 30 optical path difference optical path difference

APPARATUS AND METHOD FOR MEASURING THICKNESS OF THIN SEMICONDUCTOR MULTI-LAYER FILM

This disclosure is a division of patent application Ser. No. 08/262,840, filed Jun. 21, 1994.

FIELD OF THE INVENTION

The present invention relates to an apparatus and a method for measuring the thickness of a thin semiconductor multi-layer film and, more particularly, to an improvement in an apparatus for non-destructively measuring, without direct contact, the thicknesses of respective layers of a thin multi-layer film of epitaxially grown crystalline semiconductor layers.

BACKGROUND OF THE INVENTION

Recently, thin film techniques have been advancing. For example, semiconductor devices having various pattern structures with submicron features have been developed, such as semiconductor lasers, GaAs HEMTs (high electron mobility transistors), and HBTs (heterojunction bipolar transistors). To produce these semiconductor devices with a high degree of repeatability, particularly in compound semiconductor devices, it is important to control the thicknesses of epitaxially grown thin crystalline films.

Conventionally, thicknesses of thin films are measured in a cleaved cross-section of a sample with an SEM (scanning electron microscope). However, this method is destructive and requires etching of a sample and, therefore, cannot be used in a manufacturing line.

A non-destructive interference method of measuring layer thickness has recently been used. This method employs Fourier Transformation Infrared Spectroscopy (hereinafter referred to as FTIR) apparatus having a Fourier transformation processing function and a light dispersing spectroscopy apparatus. This method comprises irradiating a sample with infrared light having a relatively wide wavenumber range from far infrared to near infrared, having a spectrum wavenumber modulation band of 0 to 32000 cm$^{-1}$ and Fourier transformation of the interference spectrum to produce a space interference waveform (hereinafter referred to as Spatialgram), thereby evaluating the thicknesses of the layers of the multi-layer film.

FIG. 4(a) is a block diagram illustrating the construction of the FTIR apparatus. In FIG. 4(a), reference numeral 13 designates a Michelson interferometer emitting an interference light flux that is modulated in time. Numeral 26 designates a photometry system for spectrometry of the reflected light obtained by irradiating a sample with measuring light from the interferometer 13. Numeral 150 designates a spectroscopy apparatus comprising the Michelson interferometer 13 and the photometry system 26 for continuous spectrometry of the reflected light from the multi-layer film in a range from visible light to the far infrared. Numeral 200 designates a data processing apparatus for Fourier transformation of the electrical signal that is obtained from the light measurement by the photometry system 26 of the spectroscopy apparatus 150 and further analysis of the signal.

FIG. 4(b) is a flowchart schematically illustrating the data processing performed by the FTIR apparatus. In the figure, reference numeral 200a designates measuring the interference light intensity waveform. Numeral 200b designates Fourier transformation of the interference light intensity waveform measured at the step 200a. Numeral 200c designates reverse Fourier transformation of the result obtained by the Fourier transformation at the step 200b.

FIG. 5 is a block diagram illustrating the construction of the data processing apparatus. In FIG. 5, reference numeral 2001 designates an interference light intensity waveform measuring section for measuring the interference light intensity waveform from the output of the detector included in the photometry system. Numeral 2002 designates a memory for storing the measured result of the interference light intensity waveform measuring part 2001. Numeral 2003 designates a Fourier transformation means for Fourier transformation of the output of the interference light intensity waveform measuring part 2001 and of the data from the memory 2002. Numerals 2004 and 2005 designate memories for storing the Fourier transformed results from the Fourier transformation means 2003. Numeral 2006 designates a subtracter for obtaining the difference between the output of the two memories 2004 and 2005. Numeral 2007 designates a filter for filtering the output of the subtracter 2006. Numeral 2008 designates a reverse Fourier transformation means for reverse Fourier transformation of the output of the filter 2007. Numeral 2009 designates a burst interval measuring means for measuring the burst interval from the output of the reverse Fourier transformation means 2008.

The operation of the apparatus is described with reference to FIGS. 4(b) and 5. First of all, the sample is irradiated with the interference light flux emitted from the Michelson interferometer 13 and the light reflected by the sample is received by the photodetector included in the reflection light photometry system 26. The received light is converted into an electrical signal as an interference light intensity waveform (at step 200a).

This interference light intensity waveform is Fourier transformed (at step 200b) and is subjected to a predetermined filtering process and the filtered result is reverse Fourier transformed to produce a Spatialgram (at step 200c). From the interval between burst peaks in this Spatialgram, the thickness of a layer is determined.

The interference light intensity waveform including the thickness information for the thin multi-layer film is measured by the interference light intensity waveform measuring part 2001 from the electrical signal that is forwarded from the detector in the photometry system. This interference light intensity waveform is Fourier transformed by the Fourier transformation means 2003, resulting in a spectrum. Prior to the measurement of the interference light intensity waveform for the sample, the interference light intensity waveform data are measured by the same method on a standard sample which is produced by, for example, evaporating gold on a semiconductor substrate and these data are stored in the memory 2002. Then, the interference light intensity waveform data of the standard sample are read out from the memory 2002 as required and Fourier transformed, resulting in the spectrum. The spectrum of the thin multi-layer film sample and the spectrum of the standard sample are stored in the memories 2004 and 2005, the contents of the memories are input to the subtracter 2006 to obtain a difference spectrum, and the difference spectrum in the noise wavenumber band is subjected to filtering in the filter 2007 to remove noise. The difference spectrum obtained is reverse Fourier transformed by the reverse Fourier transformation means 2008, thereby producing a Spatialgram called a Kepstrum. In the Kepstrum, there are bursts because all the respective reflected light components are intensified by interfering with each other at positions where the optical path length differences due to differences between the positions of the moving mirror coincide with the optical path length differences between the respective reflected light components from the sample. These distances between respective bursts correspond to the optical path length differences between respective reflection light components. Accordingly, by measuring the distance between the bursts with the burst interval measuring means 2009, the optical path length differences and the thicknesses of respective layers are obtained.

By performing the waveform analysis on the Kepstrum obtained utilizing the Fourier analysis, the thicknesses of respective layers of the thin multi-layer film are obtained.

This prior art film thickness measuring method employing the FTIR method will be described with reference to FIG. 10 showing a conceptual diagram of the optical system. In FIG. 10, reference numeral 10 designates a light source emitting light irradiating a sample. Reference numeral 12 designates a non-spherical mirror converting the light from the light source 10 into a parallel light beam. Numeral 14 designates a beam splitter for dividing the parallel light beam from the non-spherical mirror 12 into two parts. Reference numeral 15 designates a fixed mirror reflecting the light transmitted through the beam splitter 14. Reference numeral 16 designates a moving mirror reflecting the light reflected from the beam splitter 14. Numeral 17 designates a driver for scanning the moving mirror 16 at a constant speed. Reference numeral 13 designates a Michelson interferometer generating an interference light flux and comprising the beam splitter 14, the fixed mirror 15, the moving mirror 16, and the driver 17.

Reference numeral 27 designates an aperture for limiting the magnitude of the interference light from the beam splitter 14 of the Michelson interferometer 13. Reference numeral 28 designates a plane mirror reflecting the parallel light beam from the aperture 27 to change its direction. Reference numeral 11 designates a sample irradiated by the parallel light beam from the plane mirror 28. Reference numeral 29 designates a plane mirror reflecting the parallel light beam reflected from the sample 11 to change its direction. Reference numeral 30 designates a non-spherical mirror on which the parallel light beam from the plane mirror 29 is incident. Reference numeral 21 designates a detector for detecting the light collected by the non-spherical mirror 30. Reference numeral 26 designates a reflection photometry system for metering the sample comprising the aperture 27, the plane mirror 28, the sample 11, the plane mirror 29, and the non-spherical mirror 30.

The light emitted from the light source 10 is converted into a parallel light beam by the non-spherical mirror 12 and is introduced into the Michelson interferometer 13. The Michelson interferometer 13 includes the beam splitter 14 for dividing the incident parallel light beam into two parts, the fixed mirror 15 reflecting the light transmitted by the beam splitter 14, and the moving mirror 16 reflecting the light reflected from the beam splitter 14 which is scanned at a constant speed by the driver 17. The transmitted light and the reflected light of the beam splitter 14 are respectively reflected by the fixed mirror 15 and the moving mirror 16 and again returned to the beam splitter 14 and synthesized on that plane to interfere with each other. This interference light is an interference light flux that is modulated in time by the constant speed scanning of the moving mirror 16 and exits at the side of the aperture 27 for reflection photometry. The parallel light beam from the Michelson interferometer 13 is reformed to an arbitrary magnitude by the aperture 27 and then changes direction at the plane mirror 28. This parallel light beam irradiates the surface of the sample 11. The light reflected from the sample 11 is subjected to interference due to the multiple film construction of the sample 11, changes its direction at the plane mirror 29, and is collected on the light receiving surface of the detector 21 by the non-spherical mirror 30.

FIG. 6 shows the reflection light paths of one-dimensional light reflected at respective layers of the light flux incident on the sample by the reflection photometry system of the Michelson interferometer shown in FIG. 10. In FIG. 6, reference numeral 1 designates a semiconductor substrate and reference numerals 2, 3, and 4 designate thin semiconductor films successively laminated on the semiconductor substrate 1 in this order. Reference numeral 5 designates light incident on the sample from the Michelson interferometer. Numeral 6 designates light reflected from the surface of the thin semiconductor film 4 at the uppermost layer of the sample. Numeral 7 designates light reflected at the interface between the thin semiconductor film 4 and the thin semiconductor film 3. Numeral 8 designates light reflected at the interface between the thin semiconductor film 3 and the thin semiconductor film 2. Numeral 9 designates light reflected at the interface between the thin semiconductor film 2 and the semiconductor substrate 1.

Suppose that the film thicknesses and refractive indices of the thin semiconductor films 2, 3, and 4 are respectively, $(d_1, n_1)$, $(d_2, n_2)$, and $(d_3, n_3)$ and the refractive index of the substrate 1 is $n_s$. The light reflected by respective layers produces phase differences due to different respective optical path lengths and are synthesized at the surface of the sample 11 and interfere with each other. The optical path length difference $\delta_i$ of the reflected light component reflected at the interface between the i-th layer and (i+1)-th layer for the reflected light component 5 at the surface of the sample 11 is given by the following formula (1).

$$\delta_i = \sum_{j=1}^{i} 2d \sqrt{(n_j^2 - \sin^2 \theta_j)} \tag{1}$$

The thicknesses of the respective layers are obtained from an analysis of the interference light intensity waveform of the reflected light utilizing the phase difference on the basis of the $\delta_i$.

Generally, a method of evaluating layer thickness from the analysis of the interference fringes of the reflected interference spectrum of a thin film is adopted. This method is effective in a case where the film comprises a single layer. However, when the film comprises a plurality of layers, it is quite difficult and not practical to separate and analyze each of the fringes. Therefore, the Fourier analysis is utilized, i.e., the film reflection interference spectrum is filtered to remove noise, and the filtering result is reverse Fourier transformed to obtain a Spatialgram corresponding to the moving distance of the moving mirror 16. In the Spatialgram, respective bursts appear because all the light beams intensify each other by interference at positions where the optical path difference corresponding to the scanning position of the moving mirror 16 coincides with the optical path length difference of respective reflection light components. This intensification is represented in formula (1), and the distances between respective bursts correspond to the optical path length differences between respective reflected light beams.

FIG. 11 shows a Spatialgram obtained from the reflected light shown in FIG. 6. The abscissa represents the position of the moving mirror 16 and the ordinate represents reflected light interference intensity. In the figure, the center burst 31 corresponding to the reflected light component 6 at the surface of the sample 11 appears as the origin and the symmetrical reflected light components 7, 8, and 9 of respective layers produce respective side burst peaks 32, 33, and 34. Provided that the distances from the center burst 31 to the respective side burst peaks are Li (i=1, 2, 3), an optical path length difference $\delta_i$ between the respective reflected light components coincides with $2L_i$, a sum of the incident path and the reflected path to and from the moving mirror 16. Therefore, the following equation is obtained from the above-described formula (1):

$$2L_i = \Sigma\, 2d_i \sqrt{(n_i^2 - \sin^2\theta_i)} \quad (2)$$

By performing a waveform analysis of the Kepstrum that is obtained by reverse Fourier transformation of the reflected interference light of the multi-layer film, it is possible to obtain thickness information for the respective layers of the multi-layer film.

However, in this prior art method, the thin film measurement limit ($d_{limit}$) is determined by the formula (3) according to the photometry wavenumber range $\Delta$.

$$d_{limit} = 1/(2 \cdot \Delta \cdot n) \quad (3)$$

This is equivalent to the fringe interval in the interference wavenumber in wavenumber (or wavelength) space of the single layer film having a thickness d and a refractive index n, corresponding to $1/(2 \cdot d \cdot n)$ and shows that the thickness separation limit in the Spatialgram for a multi-layer film requires information on the interference components of respective films corresponding to one interference fringe in wavenumber space.

Accordingly, the thickness measuring limit of a thin film is determined by the photometry wavenumber range that, in turn, is determined by the photometry system and the absorption of the material of the measured multi-layer film.

With respect to the transmission characteristics of the light of the photometry system, Japanese Published Patent Application Hei. 5-302816 discloses a system that is responsive to a wider wavenumber range because of an improvement in the optical parts and employment of composite materials having different transmission wavenumber bands. For example, a light source, an optical system, and a light receiving part for common use have wavenumber characteristic ranges mutually overlapping each other.

FIG. 12(a) shows construction of an optical detector in a thin semiconductor multi-layer film thickness measuring apparatus having a light source, an optical system, and a light detector for common use that have wavenumber characteristic ranges mutually overlapping each other. In the figure, reference numeral 21a designates a beam splitter for splitting the light beam collected by the light collecting mirror. Reference numerals 21b and 21c designate a mercury cadmium telluride (MCT) detector and a silicon detector that convert the light divided by the beam splitter 21a into an electrical signal. Reference numeral 21d designates an electrical signal synthesizer circuit for synthesizing electrical signals obtained from the MCT detector 21b and the silicon detector 21c, respectively.

By constructing the photodetector as such, the detection sensitivity of the detector amounts to the sum of the sensitivity characteristics of the MCT detector and the silicon detector, whereby sensitivity characteristics that cannot be achieved with a single photodetector are obtained.

As shown in FIG. 12(b), the MCT detector 21b can be replaced by a low cost tri-glycine sulfate (TGS) detector 21e. In this case, since parts for cooling the MCT detector are not required, the apparatus is simplified and cost is reduced.

FIG. 13 shows an improvement of the photodetector shown in FIG. 12(a). The MCT detector 21b and the Si detector 21c are fixed in the same plane with epoxy resin or the like in a liquid nitrogen cooler 50 that cools the MCT detector 21b. A light beam collected by a collecting mirror 30 enters directly into both the MCT detector 21b and the Si detector 21c and is detected at the same time. Then, the electrical signals output from the detectors are synthesized in the electrical signal synthesizer circuit 21d.

Employing such a construction, influences due to the transmission characteristic of the beam splitter disappear and the photometric wavenumber ranges of both the detectors 21b and 21c are obtained more immediately, improving the photometry precision.

In FIG. 14, three kinds of photodetectors are employed as a complex photodetector. By arranging a germanium (Ge) detector 44 in the same plane as the MCT detector 21b and the Si detector 21c, the sensitivity valley of the synthesized sensitivity characteristic of the MCT detector 21b and Si detector 21c is compensated. It is desirable to employ an MCT detector having a larger area than the other detectors because the MCT detector 21b is inferior in sensitivity to other detectors. Such a construction provides a photodetector having a high sensitivity and a wide photometric wavenumber range.

FIG. 15 is a chart of wavenumber characteristic ranges of various kinds of light sources, photodetectors, and beam splitters. According to the sum of the wavenumber characteristic ranges of both the MCT detector and the Si detector, the possibility of detection over a wide range from around 25000 cm$^{-1}$ to 500 cm$^{-1}$ is presented. This suggests that light in a range from visible light (blue light) to far infrared light is possibly detected by a complex photodetector incorporating an MCT detector and an Si detector for optimization. In FIG. 15, subscripts A, B, and C in parentheses represent photodetectors comprising the same materials but with different composition ratios.

FIGS. 16(a) and 16(b), respectively, show light transmission members corresponding to the beam splitter. In both FIGS. 16(a) and 16(b), reference numeral 54 designates a region comprising calcium fluoride (CaF$_2$) and numeral 55 designates a region comprising quartz (SiO$_2$). By employing two materials having different light transmission bands for respective halves of the light transmission area of the beam splitter, the characteristic wavenumber range of the beam splitter is enlarged to the sum of the respective characteristic wavenumber ranges of the two materials. In the above-described construction, according to the column of the beam splitter in the table of FIG. 15, the aggregate wavenumber characteristic range of the beam splitter employing calcium fluoride (CaF$_2$) and quartz (SiO$_2$) is approximately from 25000 cm$^{-1}$ to 2000 cm$^{-1}$. In addition, the construction of FIG. 16(b) having more than two different materials for the respective sectioned areas arranged alternatingly can reduce the destruction of wavefronts of a transmitted light beam to a larger extent than the construction of FIG. 16(a) having two different materials for the half-sectioned areas, thereby providing a more uniform inplane beam intensity.

The beam splitter may comprise three materials as shown in FIG. 16(c). In the construction of FIG. 16(c), a calcium fluoride (CaF$_2$) region 54, a quartz (SiO$_2$) region 55, and a potassium bromide (KBr) region 52 are arranged at the triple-sectioned areas of the light transmission region. According to the beam splitter column of FIG. 15, the beam splitter including calcium fluoride, quartz, and potassium bromide enables optical measurement in a wavenumber range of approximately from 25000 cm$^{-1}$ to 400 cm$^{-1}$, thereby enlarging the long wavelength band to a larger extent than the construction employing two materials shown in FIGS. 16(a) and 16(b).

In addition, a system in which the light source is improved as shown in FIG. 17 may be employed. In FIG. 17, light beams from a tungsten halogen lamp 10a and a nichrome luminous lamp 10c are collected by collecting mirrors 10b and 10d, respectively, and are synthesized through a beam splitter 10e. The synthesized beam is reformed by an aperture 10f as a collected light source and introduced to the collimating mirror 12. Since the optical path lengths from the aperture 10f to the respective lamps 10a and 10c are equal to each other, the respective light beams from the lamps that are synthesized at the beam splitter 10e have the same wavefronts at the aperture 10f and become one parallel light beam at the collimating mirror 12.

By combining the tungsten halogen lamp 10a and the nichrome luminous lamp 10c and synthesizing the outgoing light, it is possible to irradiate a sample with a light beam of the wavenumber range from 25000 cm$^{-1}$ to 200 cm$^{-1}$ as shown in the light source column of FIG. 15.

Japanese Published Patent Application Hei. 3-110405 discloses an improvement in which the light irradiates a substrate as a parallel light beam, whereby the variation in the light incident on the sample and variations in the incident surface are reduced, and a Kepstrum including correct information for the thin multi-layer film is obtained, as shown in FIG. 10.

Japanese Published Patent Application Hei. 4-66806 discloses a data processing apparatus for processing a signal that is converted into an electrical signal by a light detector. In this apparatus, the measured photometered spectrum to be subjected to a Fourier transformation is supplemented with data of a constant value in the wavenumber bands exceeding the high band side and the low band side, whereby generation of a quasi-peak is suppressed.

FIG. 18 shows a flowchart illustrating the content of the processing performed by the data processing apparatus supplementing data of a constant value prior to the Fourier transformation. In FIG. 18, the film interference spectrum is measured by the FTIR apparatus according to a conventional method (at step 100a). The low frequency component included in the thus obtained spectrum is removed (at step 101a), resulting in a film interference spectrum as shown in FIG. 19.

In this embodiment, spectrum data that is obtained by processing the waveform data (at step 101b) is added. More particularly, as shown in FIG. 20, the reflection interference spectrum intensity data at the left side (wavenumber $\sigma_1=12000$ cm$^{-1}$) of the interference spectrum is supplemented as interference spectrum intensity data from O to $\sigma_1$ cm$^{-1}$, and the spectrum intensity data of the right side end in the figure (wavenumber $\sigma_2=12000$ cm$^{-1}$)) is supplemented as reflection interference spectrum intensity data from the wavenumber $\sigma_{max}$ cm$^{-1}$.

Subsequently, the reflection interference spectrum data after the waveform data processing is performed that is shown in FIG. 20 is Fourier transformed (at step 101c), thereby producing a Spatialgram as shown in FIG. 21 (at step 101d). The peaks of this Spatialgram are searched (at step 101d) and, from the interval between the peaks, the layer thickness is calculated (at step 101f).

When the Spatialgram shown in FIG. 21 is compared with a Spatialgram that is obtained without such data supplementation, although the reflection interference spectrum of the same wavenumber range is obtained from the same semiconductor triple-layer film, the side bursts corresponding to respective film thicknesses are significantly clarified, whereby quasi-peaks are suppressed to a great extent.

FIG. 22 shows a power spectrum corresponding to the Spatialgram shown in FIG. 21. Of course, even in FIG. 22, the peak values I, II, and III representing respective film thicknesses are much clarified and there is no obstacle to the automation of the thickness measuring operation.

Even when the Spatialgram shown in FIG. 21 is compared with a Spatialgram that is obtained without performing such data interpolation, the position of the side burst in the abscissa does not change at all. Therefore, even when the reflection interference spectrum of a relatively narrow wavenumber range is employed, an accurate thickness measurement can be performed.

Japanese Published Patent Application Hei. 4-120404 discloses subjecting a reflection spectrum that is obtained by Fourier transformation to a complex power reverse Fourier transformation, thereby clarifying the peaks by making all the burst waveforms of the same phase, whereby thickness measuring precision is improved. FIG. 23 shows a flowchart illustrating the content of the processing performed by data processing apparatus including such a complex power reverse Fourier transformation.

In FIG. 23, reference numeral 150 designates an optical system that continuously irradiates a sample with interference light flux having different wavenumbers, the sample including a thin semiconductor multi-layer film. The interference light flux reflected from the sample is detected to produce an interferogram. Reference numeral 110 designates a Fourier transformation means for Fourier transformation of the interferogram that is obtained by converting the light signal with the photodetector included in the optical system 150 to obtain a reflected light spectrum. Reference numeral 120 designates a filter for filtering the Fourier transformed signal that is obtained from the Fourier transformation means 110. Reference numeral 130 designates a complex power reverse Fourier transformation means for performing a complex power reverse Fourier transformation on the reflection spectrum that is obtained by filtering with the filter 120 to obtain a space interference waveform.

In this embodiment, the reflection spectrum that is obtained by filtering is subjected to the complex power reverse Fourier transformation by the complex power reverse Fourier transformation means 130 to obtain a space interference intensity waveform.

This complex power reverse Fourier transformation means 130 produces the space interference intensity waveform in the reverse Fourier transformation employing the composite power transformation including a cosine term and a sinusoidal term as represented by the formula (4):

$$\zeta(\chi) = \left| \int_{\sigma_e}^{\sigma_s} R(\sigma) \cdot e^{(j2\pi\sigma\chi)} \cdot f(\sigma) d\sigma \right| \quad (4)$$

$$= \left[ \left\{ \int_{\sigma_e}^{\sigma_s} R(\sigma) \cdot \cos(2\pi\sigma\chi) \cdot f(\sigma) d\sigma \right\}^2 + \left\{ \int_{\sigma_e}^{\sigma_s} R(\sigma) \cdot \sin(2\pi\sigma\chi) \cdot f(\sigma) d\sigma \right\}^2 \right]^{1/2}$$

Next, the thickness of the sample comprising a thin semiconductor multi-layer film on a semiconductor substrate is measured and evaluated. The sample comprises a GaAs substrate on which $Al_xGa_{1-x}As$ (x=0.5, 0.85 μm thick), $Al_xGa_{1-x}As$ (x=0.1, 0.1 μm thick), and $Al_xGa_{1-x}As$ (x=0.5, 1.4 μm thick) are grown. A space interference intensity waveform obtained by the complex power reverse Fourier transformation means 130 is shown in FIG. 24. In the conventional cosine reverse Fourier transformation, two burst waveforms overlap each other to produce an asymmetrical waveform so that it is difficult to find the peak position. In addition, since this asymmetrical waveform is sensitive to the filter condition in the reverse Fourier transformation and changes its shape, it is actually impossible to find the peak in this waveform and to obtain the layer thicknesses.

On the other hand, in the space interference waveform shown in FIG. 24, although the peak position interval corresponds to 0.1 μm, the burst waveforms are clearly separated and a spatial interference intensity waveform that is sufficiently stable for an actual thickness measurement is obtained.

Since the space interference intensity waveform obtained by the complex power reverse Fourier transformation includes more information than that obtained by the conventional cosine reverse Fourier transformation and respective burst waveforms all have the same phases, the precision of the thickness measurement is increased. For example, in a photometering condition having a measurement limit of 0.2 μm, a thickness measurement of a 0.1 μm thickness is possible.

Regardless of the above-described efforts, the high frequency light transmission limit $v_h$ is determined by the band edge absorption of the semiconductor material to be measured while the low frequency limit $v_l$ is determined by the crystalline lattice vibration absorption, thereby limiting the measured light wavenumber range $\Delta = v_h - v_l$ which results in a physical limit in the precision of $d_{limit}$. For example, the band edge absorption wavenumber of $Al_xGa_{1-x}As$ (x=0.45) is 16500 cm$^{-1}$, the lattice vibration absorption is about 1500 cm$^{-1}$, so $\Delta$ becomes 15000 cm$^{-1}$. When this $\Delta$ is applied in the formula (3), the $d_{limit}$ is about 0.1 μm. In other words, in the prior art technique, the thin film measuring limit is determined by the absorption of the semiconductor material, resulting in a limitation in the thickness measurement of about 0.1 μm.

SUMMARY OF THE INVENTION

It iS an object of the present invention to provide an apparatus and a method for measuring the thicknesses of layers of a thin semiconductor multi-layer film utilizing infrared light interference for non-destructively measuring the thicknesses of respective layers of the thin multi-layer film with a sub-micron precision and without contact.

Other objects and advantages of the present invention will become apparent from the detailed description given hereinafter; it should be understood, however, that the detailed description and specific embodiments are given by way of illustration only, since various changes and modifications within the scope of the invention will become apparent to those skilled in the art from this detailed description.

According to the present invention, an apparatus for measuring the thickness of the layers of a thin semiconductor multi-layer film includes means for irradiating a multi-layer semiconductor film with light having a wavenumber range from visible light to infrared, means for measuring the multi-layer thickness employing a Fourier transformation thickness measuring method that measures respective layer thicknesses from a waveform analysis of a Spatial interference waveform that is obtained from the Fourier transformation of film interference components included in light reflected from the film, means for setting respective measured values of thicknesses obtained from the waveform analysis of the Spatial interference waveform as initial values, means for obtaining a film interference waveform of one of a wavenumber dispersion spectrum and a wavelength dispersion spectrum of reflected light from a numerical calculation using an optical characteristic matrix, and a data processing apparatus for obtaining respective thicknesses from waveform fitting of the calculated values with the measured values.

Since the indefinite measuring value of the thickness of the upper layer or lower layer is intentionally changed to detect the optimum fitting waveform, even when the interference fringes are included for less than one-half of the thin film portion in the measuring wavenumber range, it is possible to fit the interference waveform for all of the multi-layer film and measure the thickness of a thin film that is not limited to the measuring wavenumber range.

According to a first aspect of the present invention, a thin semiconductor multi-layer film thickness measuring apparatus includes a first memory storing refractive index distribution and wavenumber dispersion data of respective layers of a multi-layer film, a spectroscopic apparatus for spectroscopically measuring successively the reflected light from the lower layer in a range from visible light to far infrared light, film interference spectrum operating means for forming an interference spectrum from the spectrum measured by this spectroscopic apparatus by removing the optical transmitting characteristic of the spectroscopic apparatus to take out only a multi-layer film interference component, a second memory for storing the interference spectrum that is obtained by taking out only the multi-layer interference component that is produced by the film interference spectrum operating means, Spatialgram calculating means for calculating the Spatialgram by reverse Fourier transforming only the sensitivity wavenumber band of the interference spectrum from which the optical transmitting characteristics of the spectroscopic apparatus are removed, a third memory for storing the Spatialgram that is calculated by this Spatialgram calculating means, film thickmess approximate value calculating means for calculating the side burst peak position of the Spatialgram and approximate values of respective film thicknesses by reading out the refractive index distribution of respective layers from the first memory, a fourth memory for storing the approximate values of respective thicknesses that are calculated by this film thickness approximate value calculating means, theoretical interference spectrum calculating means for calculating the theoretical interference spectrum using a characteristic matrix calculation on the basis of the refractive index distribution and wavenumber dispersion data of respective layers, and recalculating means for changing the film thickness set values of respective layers to minimize the difference between the interference spectrum and the theoretical interference spectrum and recalculating the theoretical interference spectrum to assume the real film thickness. Accordingly, by obtaining approximate layer thicknesses, producing theoretical interference spectrum waveforms from numerical calculations using the optical characteristic matrix, and waveform fitting with the original interference spectrum waveform while changing the layer thickness, it is possible to improve thickness measuring precision.

According to a second aspect of the present invention, a thin semiconductor multi-layer film thickness measuring apparatus includes a spectroscopic apparatus including a light source emitting measuring light, an interferometer producing interference light from the light from the light source that is modulated in time, an optical system including a light transmitting material for introducing the interference light to the sample to be measured and including a thin multi-layer film on a substrate, and a Michelson interferometer having a light detecting part for detecting the reflected interference light from the film.

According to a third aspect of the present invention, a thin semiconductor multi-layer film thickness measuring apparatus includes a light detecting part including a plurality of photodetectors having light measuring wavenumber bands overlapping each other, whereby the light detecting sensitivity of the reflected light from the sample is increased and a more exact thickness calculation is obtained.

According to a fourth aspect of the present invention, a thin semiconductor multi-layer film thickness measuring apparatus includes a light transmitting member including a plurality of unit members having transmission wavenumber bands overlapping each other, whereby the in-plane intensity of the measuring light incident on the sample is made uniform, a more exact measuring light is obtained, and a more exact thickness calculation is obtained.

According to a fifth aspect of the present invention, a thin semiconductor multi-layer film thickness measuring apparatus includes a light source that has a plurality of unit light sources emitting light of different wavelengths that are optically synthesized to produce a measuring light, whereby photometering over a wide wavenumber range and a more exact thickness calculation are obtained.

According to a sixth aspect of the present invention, a thin semiconductor multi-layer film thickness measuring apparatus includes an optical system that irradiates the sample with interference light as a light beam having a prescribed beam width and variations in the angle of the test light incident on the surface of the material and variations in the incident plane are reduced, whereby a Kepstrum of high precision is obtained and a more exact film thickness calculation is achieved.

According to a seventh aspect of the present invention, a thin semiconductor multi-layer film thickness measuring apparatus includes film interference spectrum operating means that processes an interference spectrum by supplementing the wavenumber range exceeding a photometering spectrum wavenumber range with constant values while producing the interference spectrum, whereby film thickness information can be obtained from the reflection interference spectrum of a relatively narrow wavenumber range and, on that basis, a more exact thickness calculation is achieved.

According to an eighth aspect of the present invention, a thin semiconductor multi-layer film thickness measuring apparatus includes Spatialgram calculating means for performing a composite power reverse Fourier transformation, whereby a more exact and stable measurement of the thickness of respective layers of the thin multi-layer film can be performed in a prescribed photometering wavenumber range and, on that basis, a more exact thickness calculation is obtained.

According to a ninth aspect of the present invention, a film thickmess measuring method employed in a thin semiconductor multi-layer film thickness measuring apparatus includes irradiating a semiconductor multi-layer film with light having wavenumbers in a range from visible light to infrared, measuring the multi-layer thickness employing a Fourier transformation film thickness measuring method measuring respective film thicknesses from a waveform analysis of the Spatial interference waveform obtained from the Fourier transformation of the interference components included in the reflected light, setting respective measured values of film thickness obtained from the waveform analysis of the Spatial interference waveform as initial values, obtaining a film interference waveform of one of a wavenumber dispersion spectrum and a wavelength dispersion spectrum of reflected light, by numerical calculation using an optical characteristic matrix, and obtaining respective thicknesses of high precision from waveform fitting of calculated values with measured values. By this construction, in the waveform fitting comparing the power reflectivity obtained by the numerical calculation utilizing the optical characteristic matrix with the interference waveform from an actual measurement, the measured values of the thicknesses of the layers of the thin film and the upper layer or the lower layer having indefinite values are deliberately changed to detect the optimum fitting waveform. Therefore, even when only one-half the interference fringe of the thin film part is included in the measuring wavenumber range, waveform fitting of the interference waveform of the entire multi-layer film is achieved and measurement of the thickness of a layer is not limited to the measuring wavenumber range.

According to a tenth aspect of the present invention, in a film thickness measuring method employed in a thin semiconductor multi-layer film thickness measuring apparatus, the refractive index dispersion and the wavenumber dispersion data of respective layers of the multi-layer film are stored, the reflected light from the lower layer film is successively spectroscopically measured in a range from visible light to far infrared light with a spectroscopic apparatus, the optical transmission characteristic of the spectroscopic apparatus is removed from this spectrum to produce an interference spectrum including only the multi-layer film interference component, the interference spectrum including only the multi-layer film interference component is stored, only the sensitivity wavenumber band of the interference spectrum from which the optical transmission characteristic of the spectroscopic apparatus is removed is reverse Fourier transformed to calculate a Spatialgram, this Spatialgram is stored, the side burst peak position of the Spatialgram is read out to calculate the approximate value of respective film thicknesses, these approximate values of respective film thicknesses are stored, the theoretical interference spectrum is obtained from a characteristic matrix calculation performed on the basis of approximate film thickness data, the refractive index distribution, and wavenumber dispersion data of respective layers, the film thickness set values of respective layers are changed to minimize the difference between the measured interference spectrum and the theoretical interference spectrum, and the theoretical interference spectrum is recalculated to assume the real film thickness with high precision. Accordingly, the apparatus produces approximate values of layer thicknesses, produces the theoretical interference spectrum waveforms from the numerical calculation of the optical characteristic matrix, and performs waveform fitting with the original interference spectrum waveform while changing layer thicknesses, thereby providing an enhanced measurement precision of layer thickness.

BRIEF DESCRIPTION OF THE DRAWINGS

FIGS. 1(a) and 1(b) are diagrams illustrating a thin semiconductor multi-layer film thickness measuring apparatus according to a first embodiment of the present invention in which FIG. 1(a) is a block diagram illustrating a schematic construction and FIG. 1(b) is a flowchart schematically illustrating operation.

FIGS. 4(a) and 4(b) are diagrams illustrating a prior art thin semiconductor multi-layer film thickness measuring apparatus in which FIG. 4(a) is a block diagram showing a schematic construction and FIG. 4(b) is a flowchart schematically showing operation.

DETAILED DESCRIPTION OF THE PREFERRED EMBODIMENTS

Embodiment 1

Figure 1A:
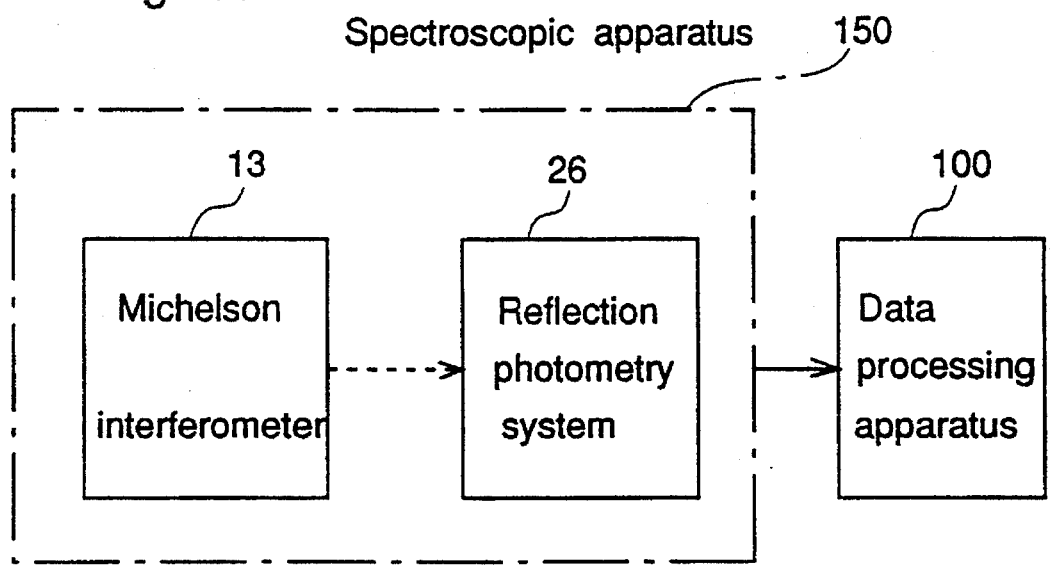

FIG. 1(a) illustrates an apparatus for measuring thicknesses of the layers of a thin semiconductor multi-layer film according to a first embodiment of the present invention.

Figure 10:
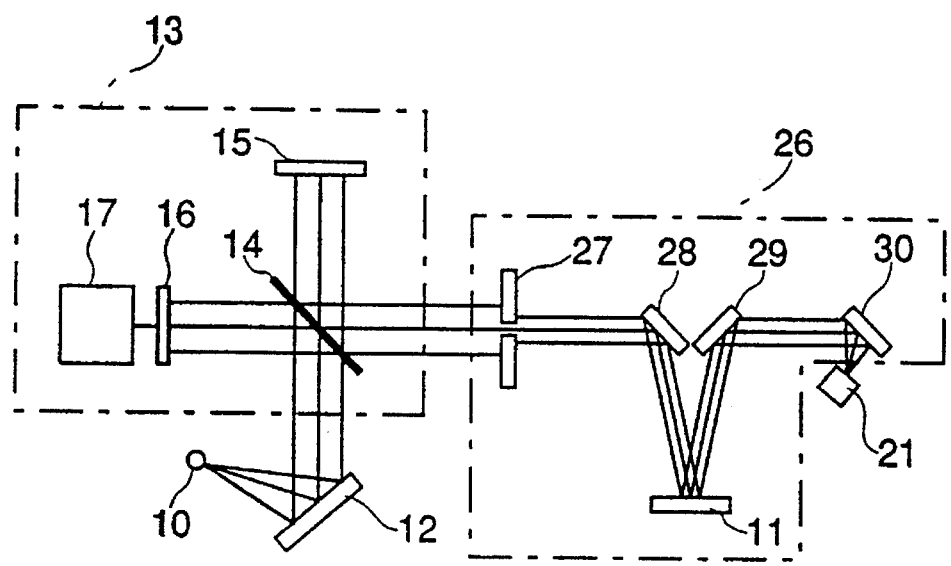
FIG. 10 is a diagram illustrating the FTIR film thickness evaluating apparatus disclosed in Japanese Published Patent Application Hei. 3-110405.
Figure 11:
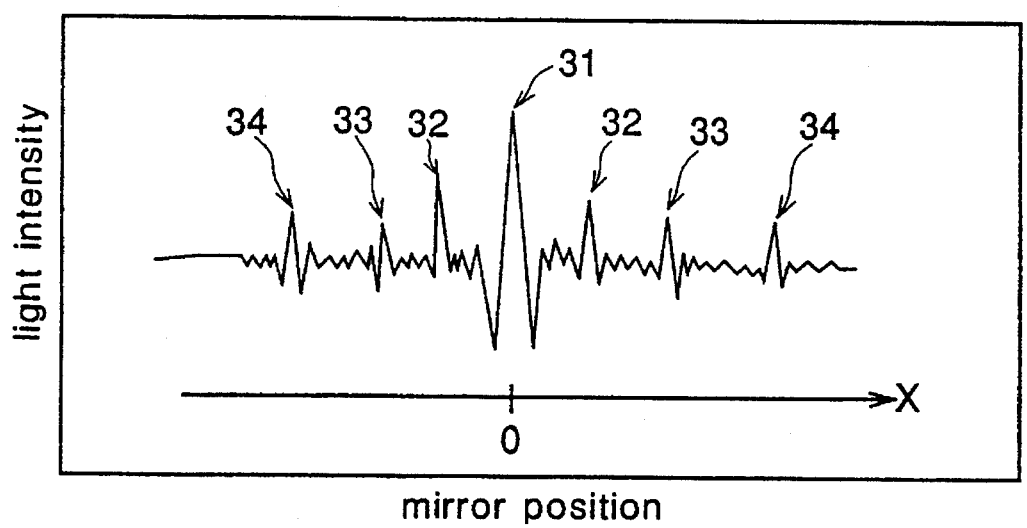
FIG. 11 is a Spatialgram.
Figure 12A:
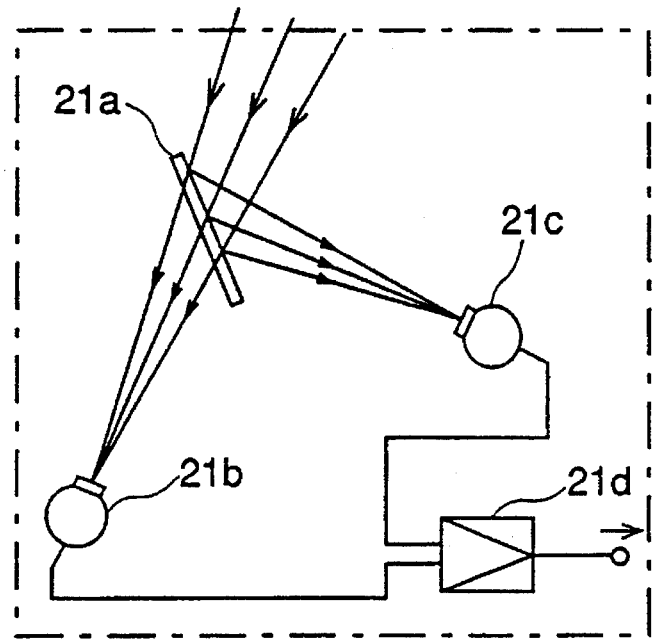
FIGS. 12(a) and 12(b) are diagrams illustrating the construction of optical detectors used in thickness measurement apparatus and employing composite photodetectors as disclosed in Japanese Published Patent Application Hei. 5-302816.
Figure 12B:
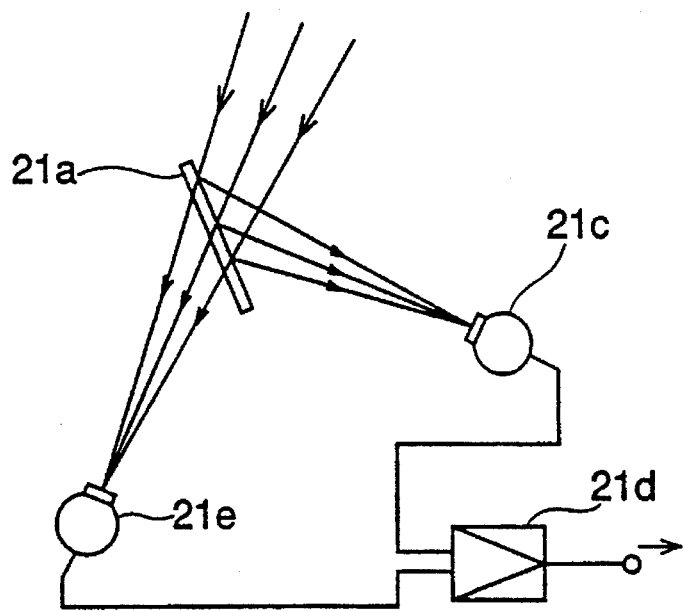
Figure 13:
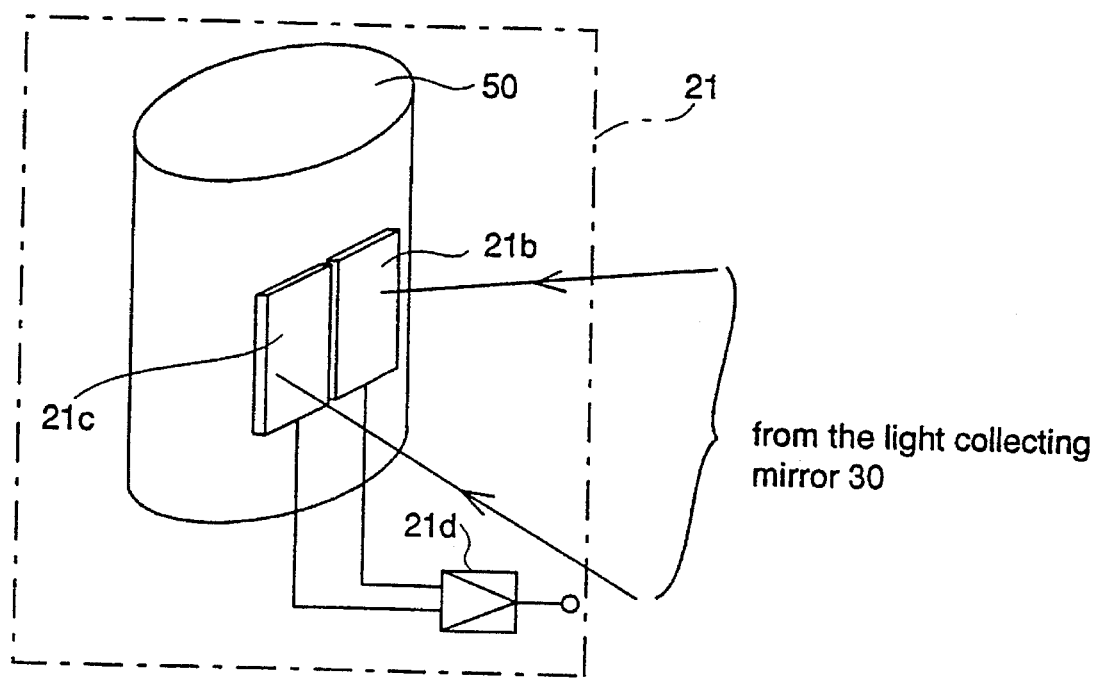
FIG. 13 is a diagram illustrating a construction of another composite type photodetector disclosed in Japanese Published Patent Application Hei. 5-302816.
Figure 14:
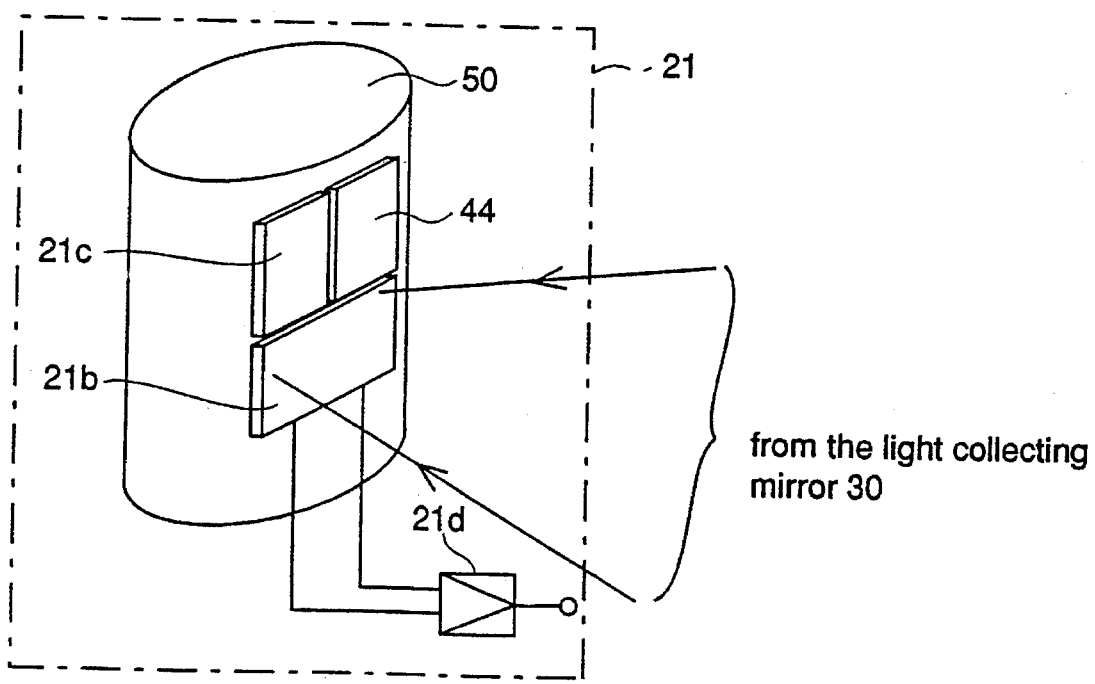
FIG. 14 is a diagram illustrating a construction of still another composite type photodetector disclosed in Japanese Published Patent Application Hei. 5-302816.
Figure 15:
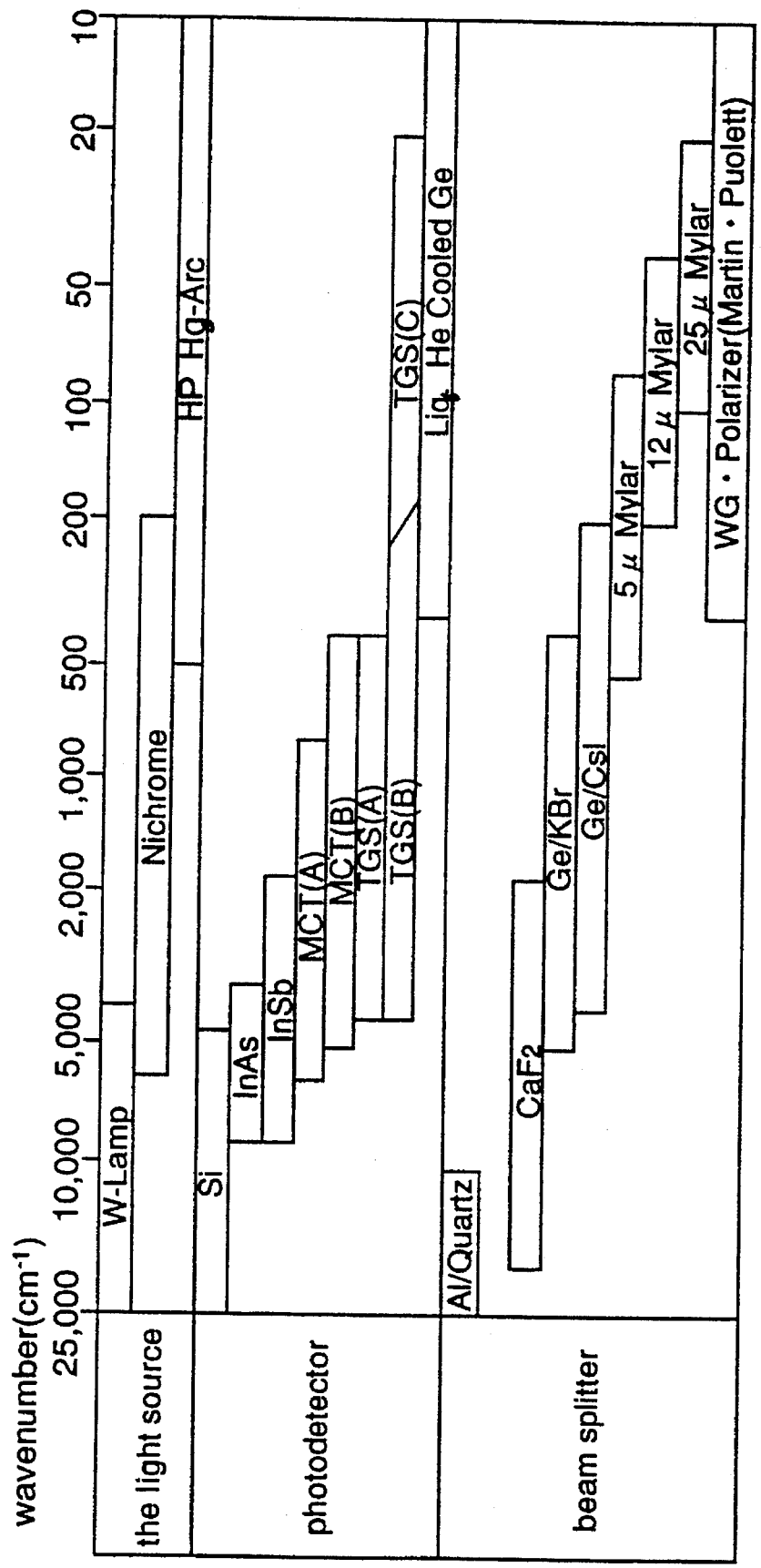
FIG. 15 is a table of characteristic wavenumber ranges of the various light sources, photodetectors, and beam splitters disclosed in Japanese Published Patent Application Hei. 5-302816.
Figure 16A:
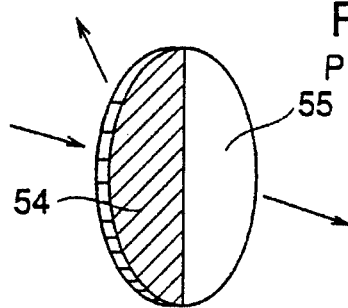
FIGS. 16(a)–16(c) are diagrams illustrating composite type beam splitters as a light transmitting material used in the semiconductor film thickness measuring apparatus disclosed in Japanese Published Patent Application Hei. 5-302816.
Figure 16B:
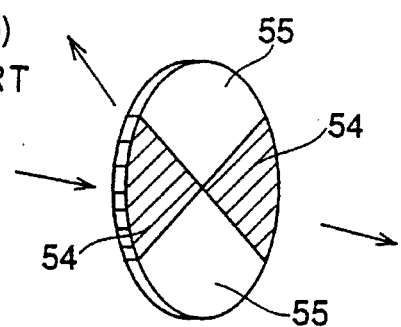
Figure 16C:
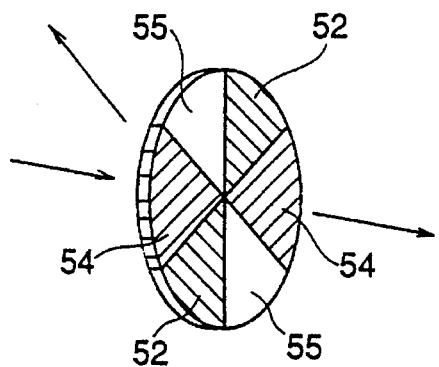
Figure 17:
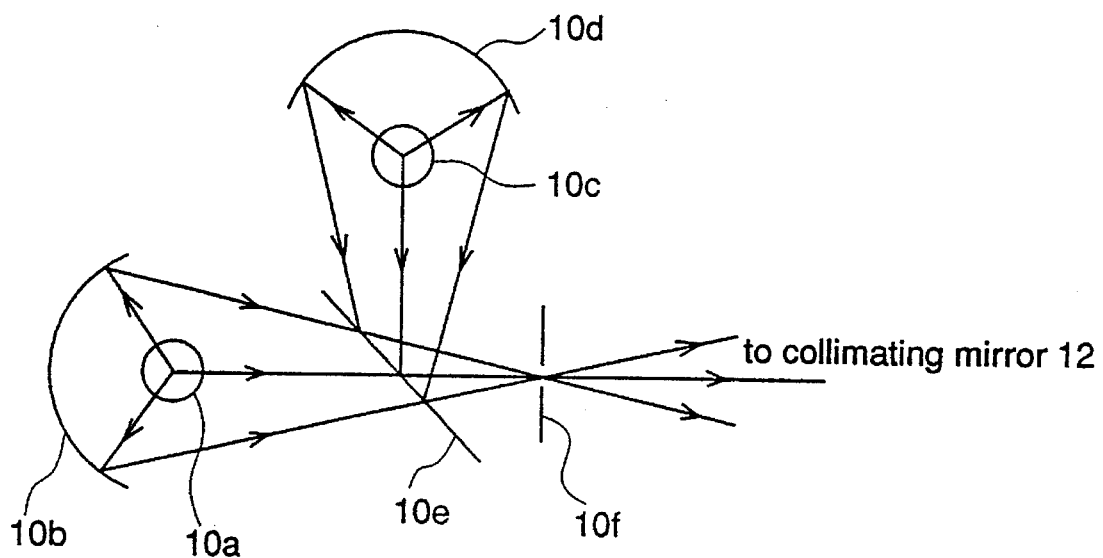
FIG. 17 is a diagram illustrating a construction of a light source of the semiconductor film thickness measuring apparatus disclosed in Japanese Published Patent Application Hei. 5-302816.
Figure 18:
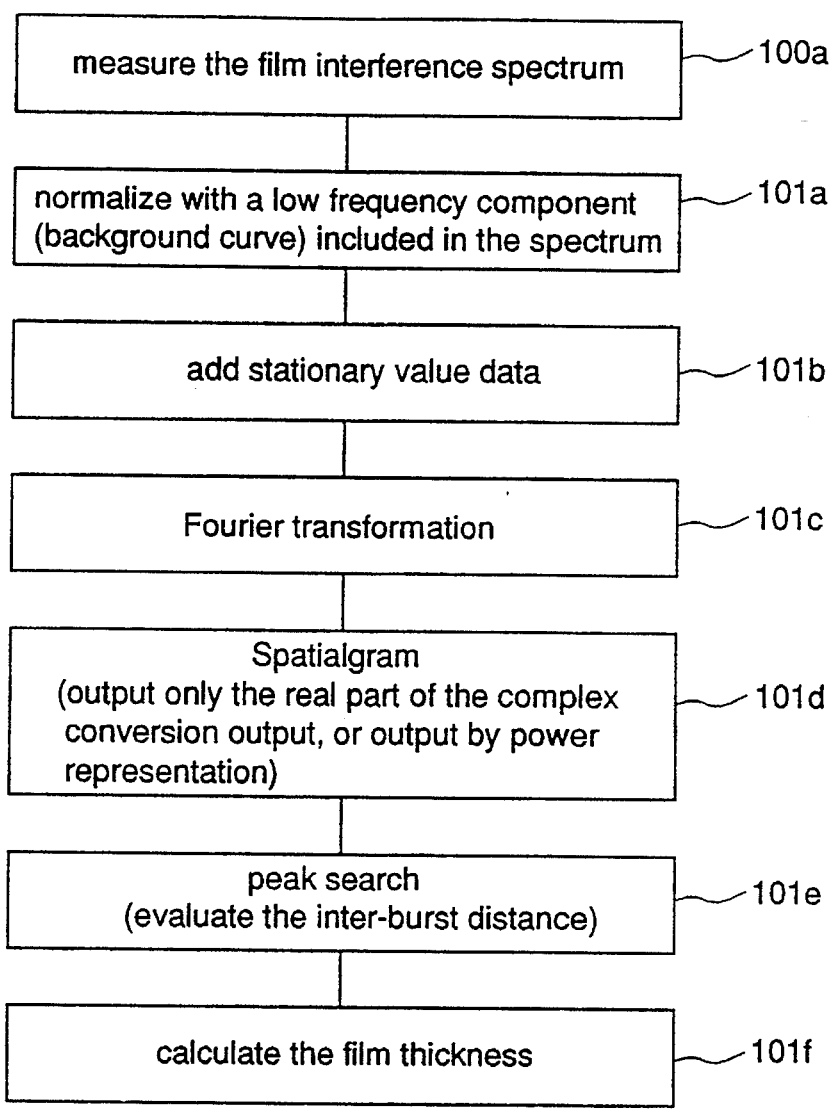
FIG. 18 is a flowchart illustrating the processing performed by the data processing apparatus in the semiconductor film thickness measuring apparatus disclosed in Japanese Published Patent Application Hei. 5-302816.
Figure 19:
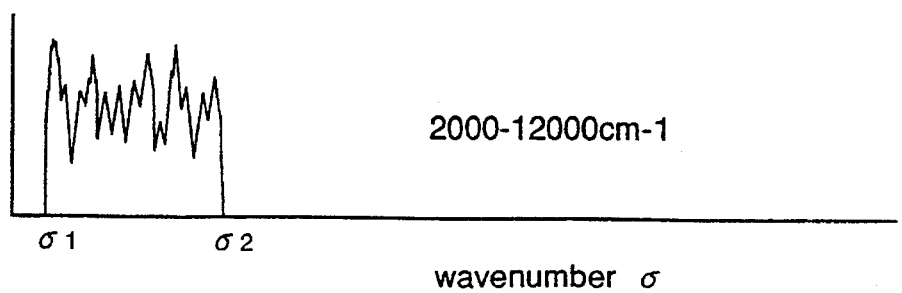
FIG. 19 is a diagram illustrating the film interference spectrum for processing according to FIG. 18.
Figure 20:
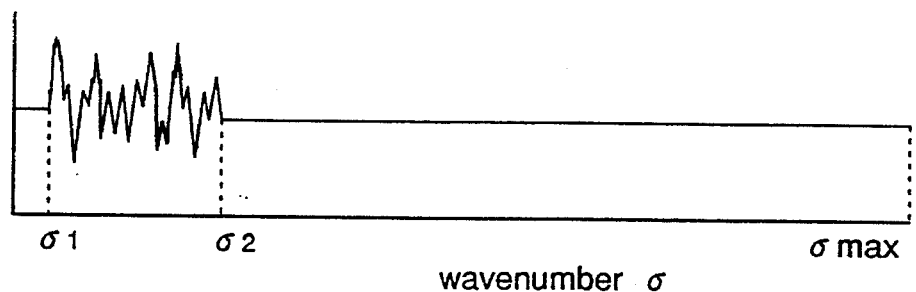
FIG. 20 is a diagram illustrating the result obtained by performing the processing of FIG. 18 of the film interference spectrum shown in FIG. 19.
Figure 21:
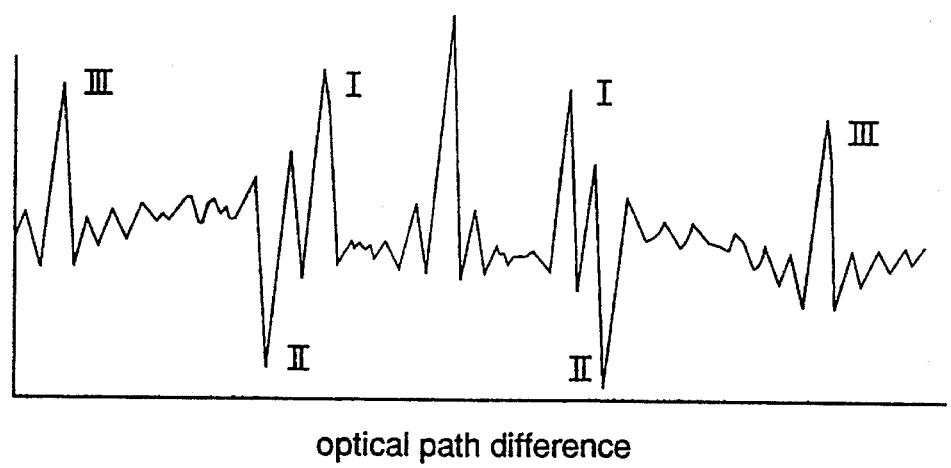
FIG. 21 is a diagram illustrating the Spatialgram obtained by data interpolation in the processing of FIG. 18.
Figure 22:
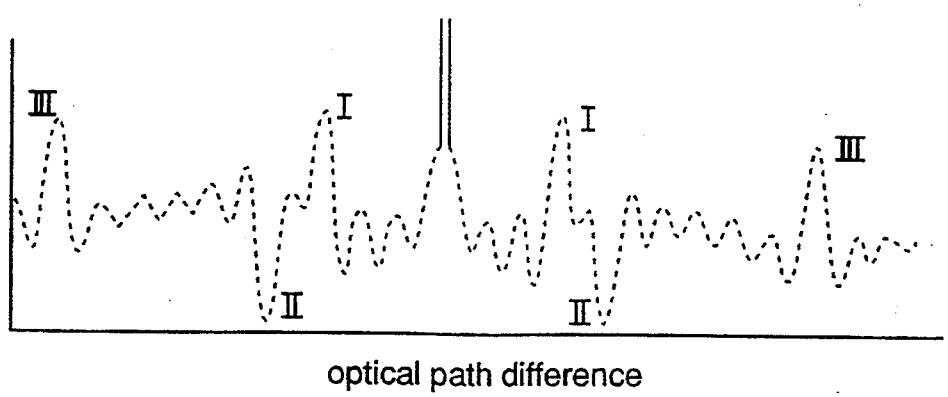
FIG. 22 is a diagram illustrating a power spectrum corresponding to the Spatialgram shown in FIG. 21.

In FIG. 1(a), reference numeral 13 designates a Michelson interferometer generating an interference light flux. Reference numeral 26 designates a photometry system for photometering the measuring light from the interferometer 13 and irradiating a sample with that light flux. Reference numeral 150 designates a spectroscopic apparatus comprising the Michelson interferometer 13 and the photometry system 26 for measuring the spectrum of the light reflected from the multi-layer film, continuously, from visible light to infrared light. Reference numeral 100 designates a data processing apparatus for Fourier transforming the electrical signal from the measured light generated by the photometry system 26 of the spectroscopic apparatus 150 and, specifically, by the optical detector of the photometry system 26. A Michelson interferometer of a type in which a parallel light beam is incident on the sample, as shown in FIG. 10, is employed.

Figure 1B:
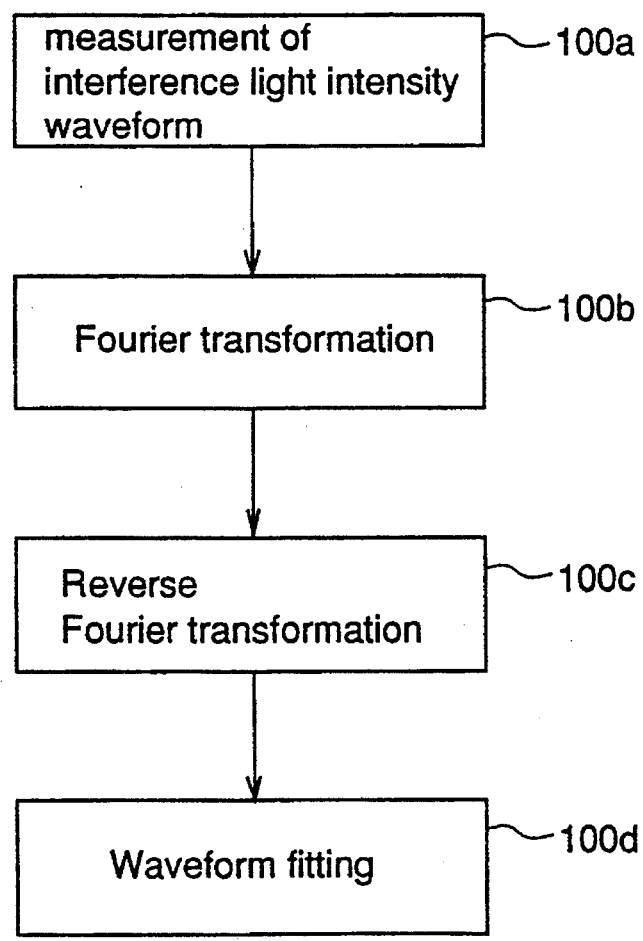

FIG. 1(b) shows a flowchart illustrating data processing performed by this data processing apparatus 100. In this figure, reference numeral 100a designates measuring the film interference spectrum, reference numeral 100b designates Fourier transformation of the film interference spectrum, and reference numeral 100c designates reverse Fourier transformation of the result of the Fourier transformation. Reference numeral 100d designates waveform fitting the result of the reverse Fourier transformation by comparing the measured and calculated interference spectrum waveforms.

Figure 2:
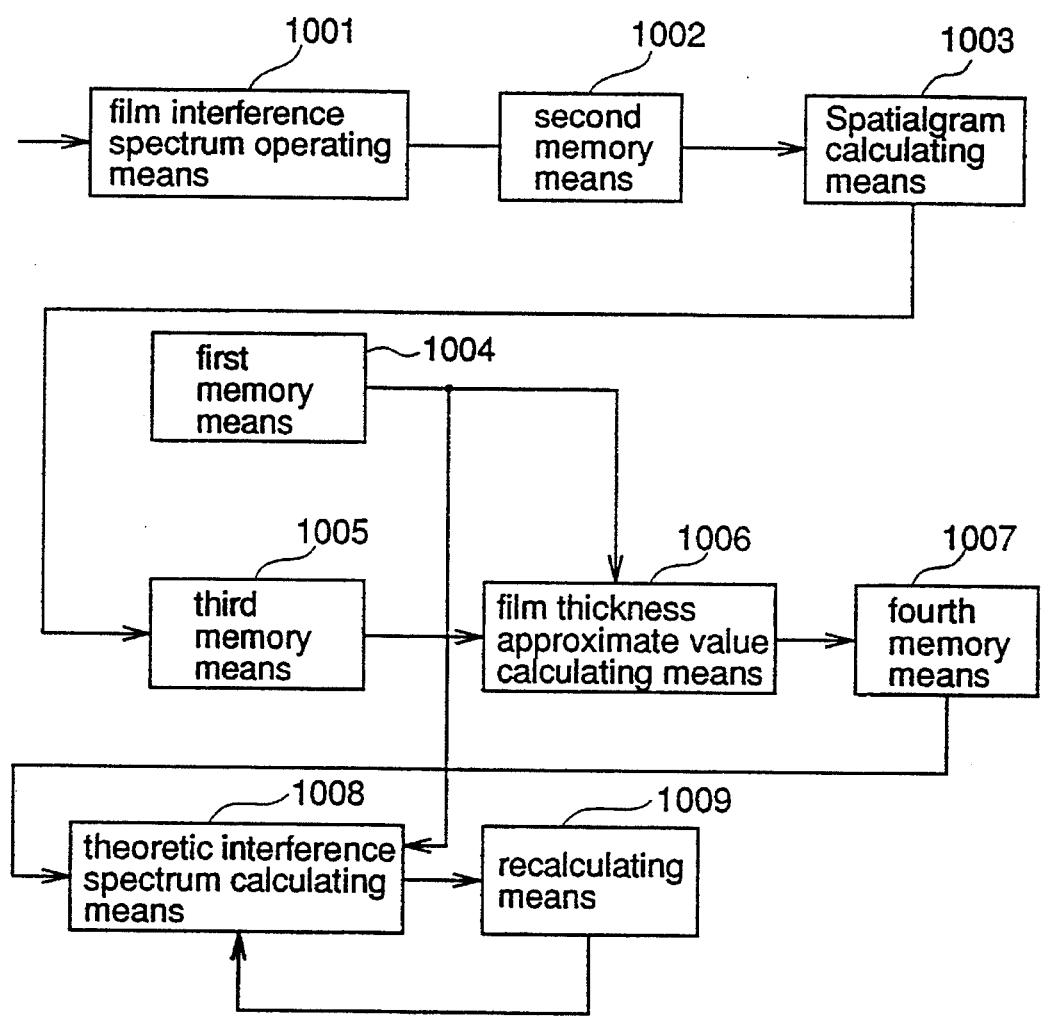
FIG. 2 is a block diagram illustrating a detailed construction of the thin semiconductor multi-layer film thickness measuring apparatus of FIG. 1(a).

FIG. 2 is a block diagram illustrating an embodiment of the data processing apparatus 100. In the figure, reference numeral 1001 designates a film interference spectrum operating means for removing the optical transmission characteristic of the spectroscopic apparatus from the spectrum to leave only the multi-layer film interference components. Reference numeral 1002 designates a second memory means for storing the interference spectrum of the multi-layer film interference components from the film interference spectrum operating means. Reference numeral 1003 designates a Spatialgram calculating means for reverse Fourier transformation of only the sensitive wavenumber band of the interference spectrum to obtain a Spatialgram. Reference numeral 1004 designates a first memory means for storing refractive index distribution and wavenumber dispersion data of the multi-layer film. Reference numeral 1005 designates a third memory means for storing data calculated by the Spatialgram calculating means 1003. Reference numeral 1006 designates a layer thickness approximate value calculating means for reading out the refractive indices and wavenumber dispersion data of respective layers of the multi-layer film stored in the first memory means 1004 and the side burst peak positions of the Spatialgram stored in the third memory means 1005 to obtain approximate values of respective layer thicknesses. Reference numeral 1007 designates a fourth memory means for storing the approximate value of the layer thicknesses calculated by the layer thickness approximate value calculating means 1006. Reference numeral 1008 designates a theoretical interference spectrum calculating means for calculating the theoretical interference spectrum using a characteristic matrix calculation based on the layer thickness approximations. Reference numeral 1009 designates a recalculating means for comparing the actual measured value of the interference spectrum and the theoretical interference spectrum and changing the layer thicknesses of respective layers to minimize the difference between both spectra and recalculating the theoretical interference spectrum.

The thin semiconductor multi-layer film measuring apparatus of this first embodiment combines the burst peak analysis method using a Spatialgram and the fringe waveform analysis method using an interference waveform in the wavenumber (wavelength) space so as to combine their advantages and compensate for their disadvantages.

More particularly, firstly, in the burst peak analysis using the Spatialgram, the thickness of a layer can be measured by this method, the total thickness of a thin layer cannot be measured by this method, but the thicknesses of an upper and lower layer between the thin layer are measured.

Secondly, assuming the layer thickness information obtained at the first step as an initial value, an interference waveform in wavenumber (wavelength) space is calculated applying the multi-layer film reflection analysis method utilizing a series of optical characteristic matrix methods. This result is fitted to the interference waveform obtained by a measurement employing the thickness of the thin layer and the thicknesses of upper and lower layers, which are indefinite, as parameters, whereby the thickness of the thin layer that cannot be measured in the first step is obtained.

In this embodiment, waveform fitting makes the power reflectivity obtained by the numerical calculation employing an optical characteristic matrix coincide with the interference waveform of the actual measurement, and the measurements of the thin film and the thicknesses of the upper and lower layers that are indefinite are changed intentionally to find the optimum fitting waveform, to increase the precision of the measurement of the layer thickness. Therefore, even when less than one interference fringe of the thin film portion is included in the measurement wavenumber range, waveform fitting of the interference waveform of the entire multi-layer film is enabled, whereby the measurement of a layer thickness is not limited to within the measurement wavenumber range.

A description is given of the operation with reference to FIGS. 1(*a*), 1(*b*), and 2. First of all, the interference light flux irradiating the sample from the Michelson interferometer 13 is received by the photodetector included in the reflection photometry system 26 and converted into an electrical signal.

The electric signal converted by this photodetector is input to the data processing apparatus 100, in which the film interference spectrum is measured (at step 100*a*), the measured result is Fourier transformed (at step 100*b*), a prescribed filtering process is performed, and the filtered result is reverse Fourier transformed to obtain a Spatialgram (at step 100*c*). Then, the thickness of a layer is obtained from the spacing of the burst peaks in the Spatialgram. By carrying out an optical characteristic matrix operation on the basis of the approximate value of the layer thickness, a theoretical interference spectrum is obtained, waveform fitting between the theoretical interference spectrum and the actual measured interference spectrum is performed, varying the layer thickness by a predetermined increment, and a layer thickness that produces a theoretical interference spectrum that is closer to the waveform configuration of the actual measured value is obtained (at step 100*d*).

A detailed description is given of the processing of this data processing apparatus. First of all, the light reflected from the multi-layer film on the sample is spectroscopically measured continuously over a range from visible light to far infrared light by the spectroscopic apparatus and the optical transmission characteristic of the spectroscopic apparatus is removed from the spectrum by the film interference spectrum operating means 1001 to obtain only the multi-layer film interference component. The interference spectrum on the multi-layer interference component obtained by the film interference spectrum operating means 1001 is stored in the second memory means 1002 and only the sensitive wavenumber region of this interference spectrum is reverse Fourier transformed by the Spatialgram calculating means 1003 to produce the Spatialgram. The data calculated by the Spatialgram calculating means 1003 is stored in the third memory means 1005.

The side burst peak position of the Spatialgram is obtained by the layer thickness approximate value calculating means 1006, the refractive indices and the wavenumber dispersion data of respective layers of the multi-layer film are obtained from the first memory means 1004 to obtain approximate respective layer thicknesses and to store them in the fourth memory means 1007, and a theoretical interference spectrum is calculated by the theoretical interference spectrum calculating means 1008 from the characteristic matrix calculation performed on the basis of the approximate layer thickness data. Then, the recalculating means 1009 compares the interference spectrum and the theoretical interference spectrum, changes the thicknesses of respective layers to minimize the differences between the spectra, and makes the theoretical interference spectrum calculating means 1008 recalculate the theoretical interference spectrum.

Figure 3:
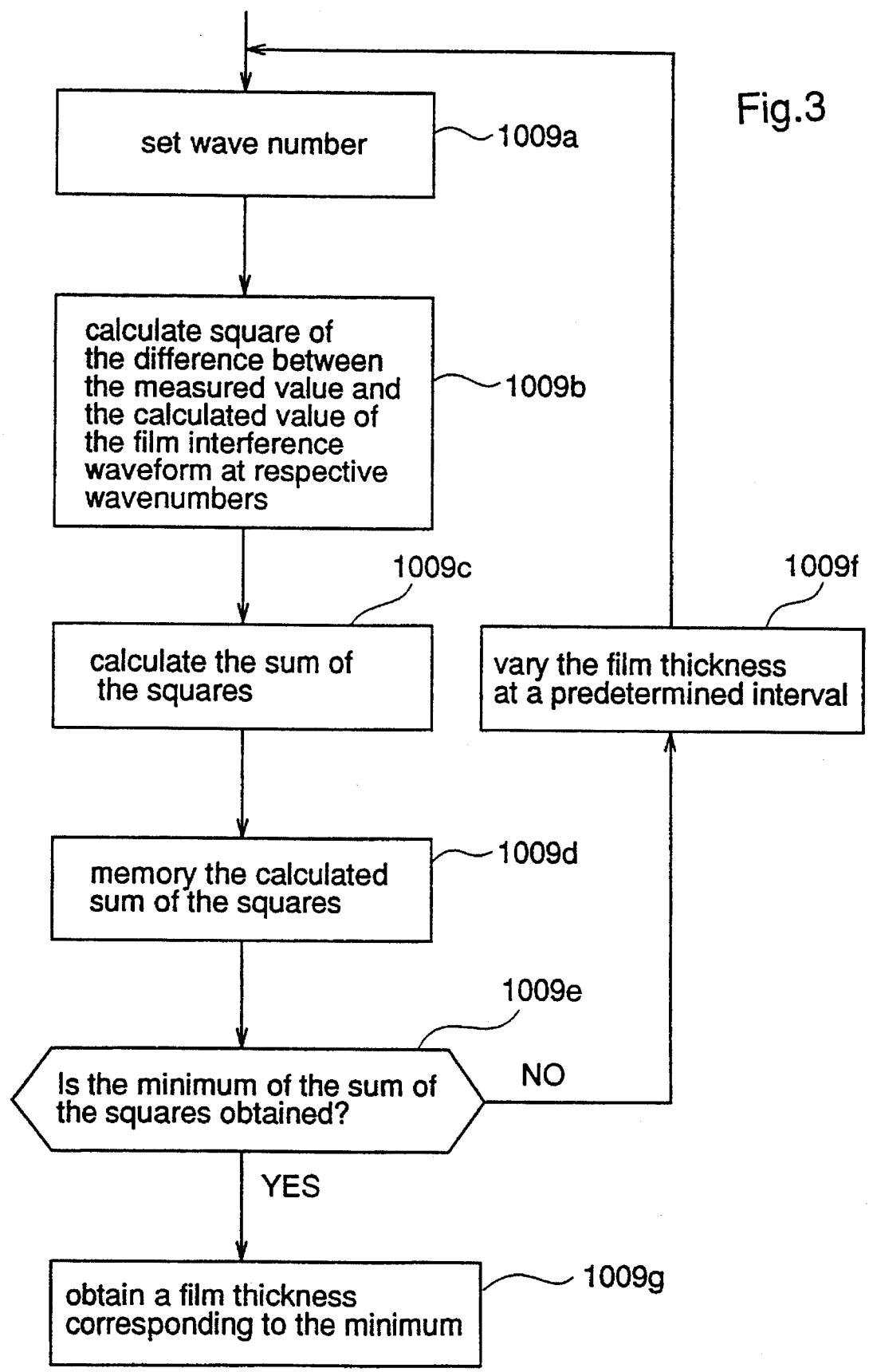
FIG. 3 is a flowchart illustrating the operation of the recalculating means of FIG. 2.

FIG. 3 shows a flowchart illustrating the recalculating procedure performed by the recalculating means. In the figure, reference numeral 1009*a* designates setting the wavenumber. Reference numeral 1009*b* designates obtaining a square of the difference between the actual measured value and the calculated value of the film interference waveforms in respective wavenumbers. Reference numeral 1009*c* designates obtaining a sum of the squares of the difference between the actual measured value and the calculated value of the film interference waveform in respective wavenumber ranges. Reference numeral 1009*d* designates obtaining the sum of the squares. Reference numeral 1009*e* designates determination of whether the minimum value of the sum of the squares is obtained. Reference numeral 1009*f* designates returning to the step 1009*a* and increasing or decreasing the layer thickness by a predetermined increment when the minimum value of the sum of the squares is not obtained. Reference numeral 1009*g* designates obtaining a layer thickness corresponding to the minimum value when the minimum value is obtained at the step 1009*e*.

Figure 4A:
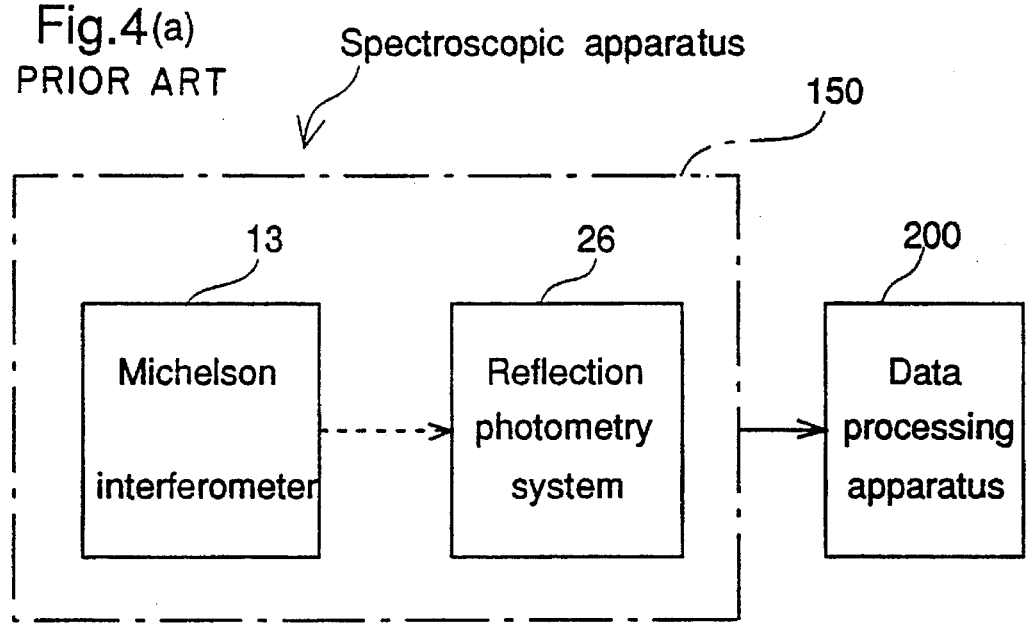
Figure 4B:
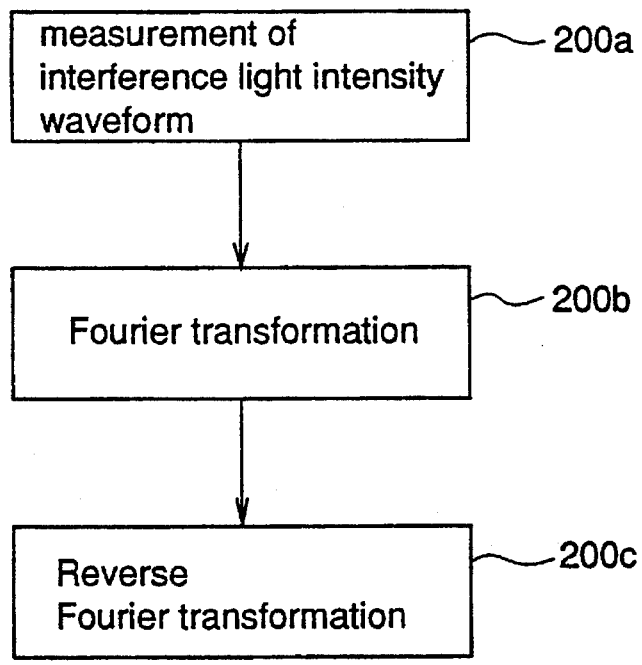
Figure 5:
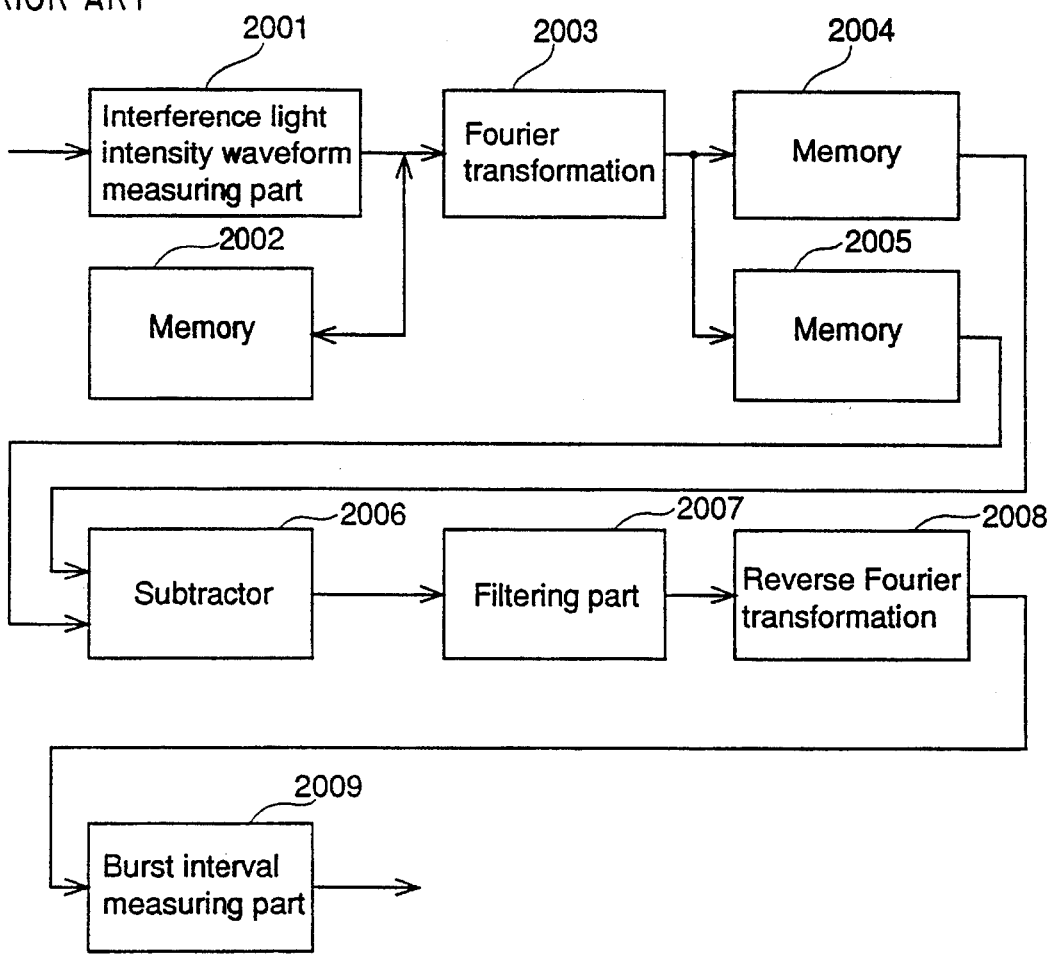
FIG. 5 is a block diagram illustrating a detailed construction of the thin semiconductor multi-layer film thickness measuring apparatus of FIG. 4(a).
Figure 6:
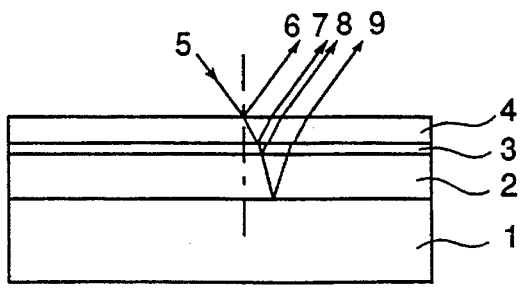
FIG. 6 is a diagram illustrating the reflection light path of the light reflected from the respective layers.
Figure 7:
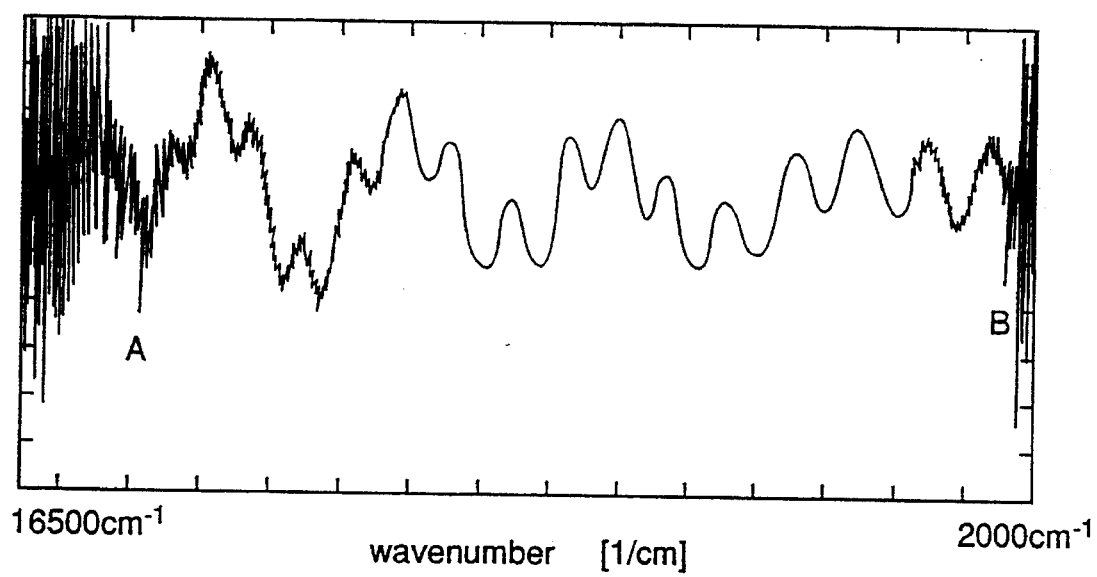
FIG. 7 is a film interference waveform in wavenumber space according to a thickness measuring example of a first embodiment of the present invention.
Figure 8:
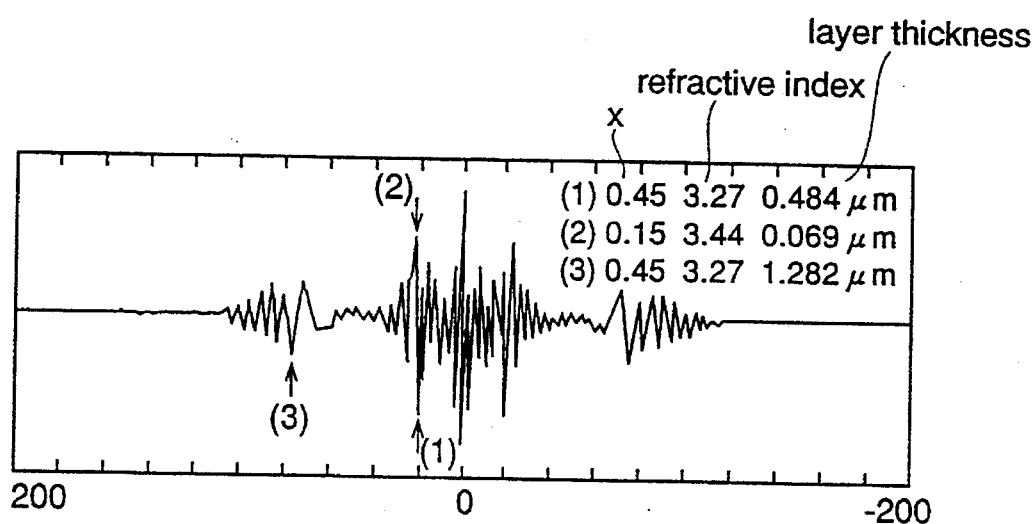
FIG. 8 is a Spatialgram obtained by reverse Fourier transformation of the interference waveform of FIG. 7 in a thickness measuring example according to the present invention.

FIGS. 9(*a*), 9(*b*), and 9(*c*) are diagrams illustrating film interference waveforms in wavenumber space that are obtained from measuring a three layer structure of $Al_xGa_{1-x}As$ layers 2 to 4 (in layer 2, Al composition x is 0.45, in layer 3, x is 0.15, in layer 4, x is 0.45) that are successively laminated on the GaAs substrate shown in FIG. 6 by means of the prior art FTIR apparatus shown in FIG. 4. In FIG. 7, the interference waveform is measured over the wavenumber range from 15500 cm$^{-1}$ (point A in FIG. 7) to 2300 cm$^{-1}$ (point B in FIG. 7). FIG. 8 shows a Spatialgram that is obtained by reverse Fourier transformation of the region from A to B of this interference waveform. In FIG. 8, the mixed composition ratios of the first layer 2 to the third layer 4 are respectively 0.45, 0.15, and 0.45, the refractive indices are respectively 3.27, 3.44, and 3.27, the calculated values of the layer thicknesses are respectively 0.484 μm, 0.069 μm, and 1.282 μm. In FIG. 8, burst peaks corresponding to the interface reflection at the respective layers appear. However, the peak corresponding to the thickness ($d_2$=0.55 μm) of the second layer 3 (x=0.15) overlaps with the peak corresponding to the first layer (x=0.45, $d_2$=0.43 μm) 2, and a correct peak separation is not obtained.

In this embodiment, using the same processing performed by the prior art FTIR apparatus as described above, the film thickness information as shown in FIG. 8 is obtained and, in addition, by setting the film thickness information obtained from the above processing as an initial value and performing a numerical calculation employing the optical characteristic matrix using the formulae (4) to (7), the waveform configuration of the theoretical interference spectrum is obtained, and waveform fitting of the waveform configuration of the theoretical interference spectrum to the waveform configuration of the actual measured interference spectrum is performed, thereby obtaining a more exact thickness measurement of a layer of a thin multi-layer film.

When a multi-layer film of n layers is represented by an optical characteristic matrix, assuming the optical characteristic matrix of the n-th layer is $M_n$ and the optical characteristic matrix of the n layers is $M^n$, the following equations apply.

$$M^n = M_1 \cdot M_2 \ldots M_{n-1} \cdot M_n = \begin{pmatrix} m1 & m2 \\ m3 & m4 \end{pmatrix} \quad (5)$$

$$M_i = \begin{pmatrix} \cos(\beta_i \cdot d_i) & -jP_i^{-1} \cdot \sin(\beta_i \cdot d_i) \\ -jP_i \cdot \sin(\beta_i \cdot d_i) & \cos(\beta_i \cdot d_i) \end{pmatrix} \quad (6)$$

$\beta_i = 2\pi \cdot \overline{n_i} \cdot \cos\theta_i/\lambda$ ($\lambda$:wavelength of incident light)
$P_i = \overline{n_i} \cdot \cos\theta_i$ ($\theta_i$:incident angle to the i-th layer)
$\overline{n_{i-1}} \cdot \sin\theta_{i-1} = \overline{n_i} \cdot \sin\theta_i$
$\overline{n_i} = n_i - jk_i$ ($\overline{n_i}$:complex refractive index of i-th layer)
$n_i$:real refrative index of i-th layer
$k_i$:attenuation coefficient of i-th layer).
j: imaginary unit $$r(\sigma) = \frac{(m1 + m2 \cdot PB) \cdot P0 - (m3 + m4 \cdot PB)}{(m1 + m2 \cdot PB) \cdot P0 + (m3 + m4 \cdot PB)} \quad (7)$$

r=amplitude reflectance σ=1/λ:wavenumber $$R(\sigma) = r \cdot r^* \quad (8)$$

R=power reflectivity
$r^*$=complex conjugate of r
$P_B = \overline{n_s} \cdot \cos\theta_s$ ($\theta_s$: incident angle to substrate)
$\overline{n_s} = n_s - jk_s$ ($\overline{n_s}$: complex refractive index of substrate,
$n_s$: real refractive index of substrate,
$k_s$: attenuation coefficient of substrate) $P_o = n_o \cdot \cos\theta_o$
($\theta_o$: incident angle to substrate, $n_o$: refractive index of air).

Figure 9A:
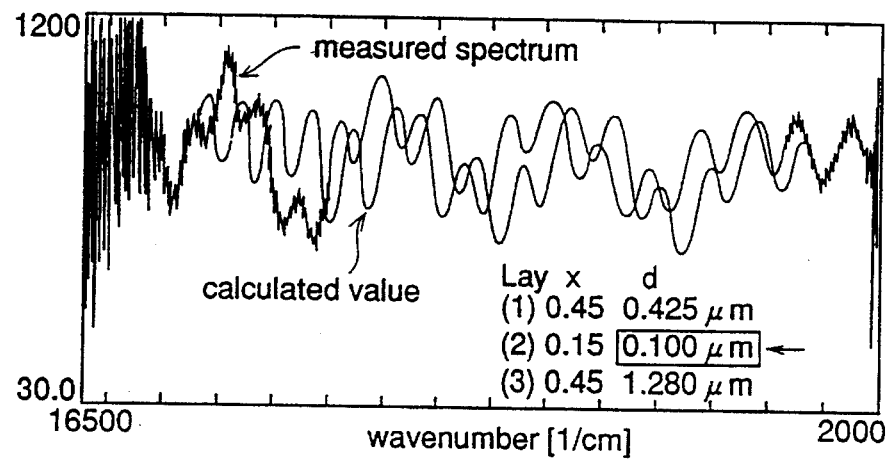
FIGS. 9(a), 9(b), and 9(c) are diagrams illustrating the use of numerical calculation in fitting measured interference waveforms to theoretical forms according to an embodiment of the present invention.
Figure 9B:
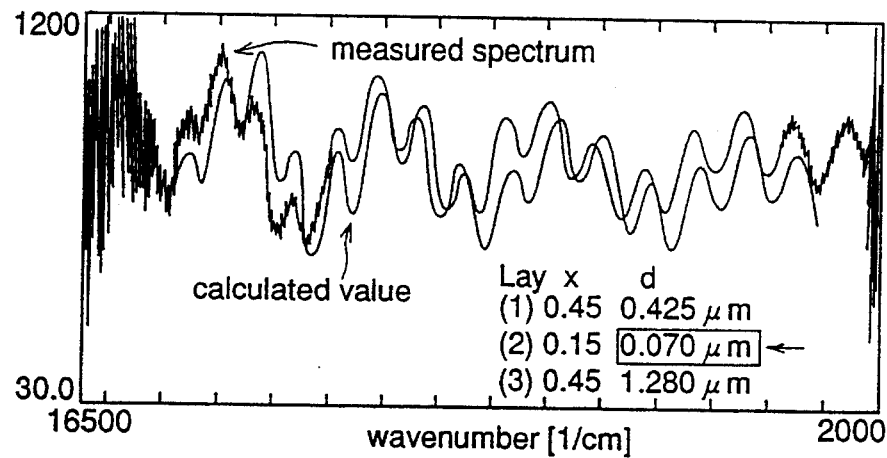
Figure 9C:
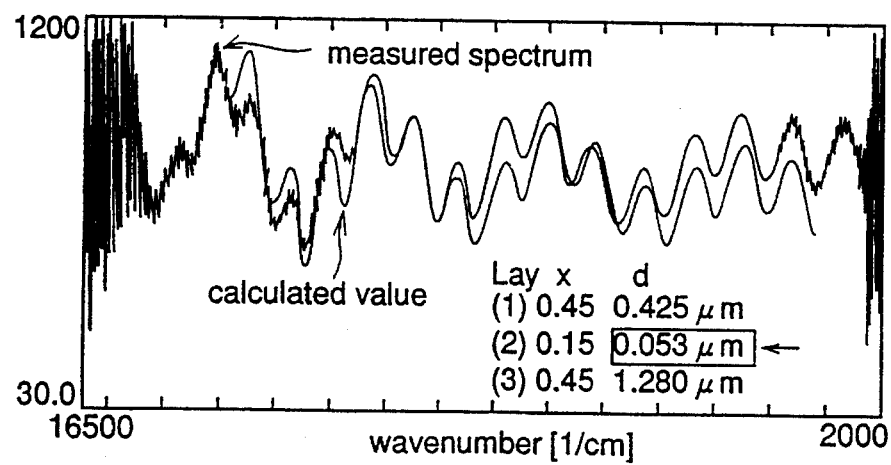

When fitting of an interference waveform to these formulae (5) to (8) employing the parameters shown in the formula (9) for n=3, the result is shown in FIGS. 9(a) to 9(c).

$$\overline{n}(\omega) = n(\omega) - jk(\omega) = \sqrt{\hat{\epsilon}(\omega)} \quad (9)$$

$\omega = f/2\pi$  f: frequency of light $\hat{\epsilon}(\omega) = \epsilon_1(\omega) - j\epsilon_2(\omega)$ $$\begin{cases} \epsilon_1(\omega) = \epsilon^*_\infty - \frac{1}{\epsilon_0} \cdot \frac{N_f e^2}{m^*} \cdot \frac{\tau^2}{\omega^2\tau^2 + 1} \\ \epsilon_2(\omega) = \frac{1}{\epsilon_0} \cdot \frac{N_f e^2}{m^*} \cdot \frac{\tau}{\omega(\omega^2\tau^2 + 1)} \end{cases}$$

$m^*$: effective mass of an electron in a crystal ~0.068 $m_o$
  ($m_o$: mass of electron in vacuum, 9.11×10$^{-31}$ [kg])
$N_f$: carrier concentration in crystal ~10$^{17}$ cm$^{-3}$ τ=m·μ/e
μ: mobility of a carrier in the crystal 300 [cm/V·S]
$\epsilon^*_\infty$: relative dielectric constant of real part of crystal at high frequency limit ~12
$\epsilon_0$: dielectric constant in vacuum=8.8542×10$^{-12}$ [F/m]
θi ~5°.

This waveform fitting can be performed by the method as shown in FIG. 3. A wavenumber is set (at step 1009a), a square of the difference between the actual measured value and the calculated value of the film interference waveform in this wavenumber is obtained (at step 1009b), and a sum of the squared values at respective wavenumbers is obtained (at step 1009c). The sum of the squares is stored (at step 1009d), and whether the minimum value of the squared sum is obtained is determined (at step 1009e). Then, the film thickness is increased or decreased at a predetermined interval (at step 1009f), and the processing is repeated to obtain the minimum sum. Then, the layer thickness corresponding to the minimum value of this sum is obtained (at step 1009g). This is the thickness of the triple layer film assumed in this embodiment.

The waveform fitting will be described with reference to FIG. 9. In FIG. 9, the waveform shown by a wide line represents the film interference waveform obtained by actual measurement, and the waveform shown by a narrow line represents a film interference waveform calculated from the formulae (4) to (7). According to this FIG. 9, by converging the thickness of the second layer by gradually reducing the thickness from 0.1 μm shown in FIG. 9(a) to 0.070 μm shown in FIG. 9(b), and further to 0.053 μm shown in FIG. 9(c), the interference waveform of the entire three layer film can be reproduced faithfully.

Accordingly, as shown in FIG. 3 described above, by decreasing or increasing the thickness at a prescribed increment so that the sum of the squares of the differences between the calculated spectra and the actual measured spectra in respective wavenumber ranges is a minimum value, and finding the thickness at which the film interference waveform obtained by calculation and by actual measurement are closest to each other, it is possible to determine precisely the thickness of the second layer and, further, the respective thicknesses of the first and third layer that were impossible to measure by the prior art method are determined.

Although there is a little deviation between the theoretical, calculated waveform and the actually measured waveform shown in FIG. 9(c), by making efforts, such as using the waveform dispersion characteristic of the complex refractive indices of respective semiconductor crystals as material constants, and data, such as free carrier absorption, close to practical values, further precision in waveform fitting can be realized.

In this way, according to this embodiment, on the basis of the Fourier transformation infrared spectroscopic method, a semiconductor multi-layer film is irradiated with a light having a wavenumber range from visible light to infrared and from waveform analysis of the space interference waveform that is obtained by Fourier transformation of the film interference component in the reflected light, the thickness of layers of the thin multi-layer film of a semiconductor device are measured employing a Fourier transformation thickness measuring method. The respective thickness values obtained from the waveform analysis of the space interference waveform are made initial values for obtaining the film interference waveform of the wavenumber dispersion (wavelength dispersion) spectrum of the reflected light employing a numerical calculation using an optical characteristic matrix. This waveform is fitted to actual measured waveforms to obtain layer thicknesses with high precision. Therefore, even when only one interference fringe of the thin film part is included in the measuring wavenumber range, a sufficient thickness resolution is obtained by waveform fitting of the interference waveform of the entire multi-layer film, and a measurement that was entirely impossible in the prior art method is achieved.

In other words, the splitting limit of the burst peak on the Spatialgram is as described above, determined by continuous photometry in the wavenumber range Δ that is determined by light transmission characteristics of the optical system and the light absorption of the multi-layer film materials. This is equivalent to the wavenumber corresponding to an inverse number of the optical path length of one forward path of the infrared light propagation in the film (n·d) and it means that one or more fringes of the wavenumber (wavelength) Spatial interference waveform of a thin monolayer are required to be included in the measuring wavenumber range. According to this embodiment, in the waveform fitting method of the (wavelength) Spatial interference waveform, by performing a Fourier transformation, the approximate value of the film thickness is measured and the original interference fringe is accurately reproduced, utilizing the optical characteristic matrix, whereby the precision of the thickness measurement is improved. Therefore, even if only one-half an interference fringe of a thin film is included in the measuring wavenumber range, a sufficient thickness resolution is obtained in the waveform fitting of an interference waveform of the entire multi-layer film, thereby enabling a measurement that was entirely impossible in the prior art method.

Although this method is a combination of the prior art techniques, this method cannot be realized from only each of respective techniques.

More particularly, (1) In using only the fringe peak analysis method of the wavenumber (wavelength) Spatial interference waveform, a film thickness measurement of a multi-layer film of more than two layers is impossible.

(2) Even when the fitting of the wavenumber (wavelength) Spatial interference waveform employing the optical characteristic matrix analysis is tried, because the order of the layers of the multi-layer film and the initial values of the thicknesses of all the layers at the start of the fitting are indefinite, the analysis is difficult and its practice is impossible.

(3) The separation of the burst peak on the Spatialgram has a limit of about 0.1 μm due to the physical limitation described above.

In the above illustrated embodiment, since the parallel light flux is incident on the sample as described above, by irradiating a sample with the measured light not focused toward the substrate but in a parallel light beam, variations in the incident angle on the sample and variations in the incident plane are reduced. Thus, it is possible to carry correct information of the thin multi-layer film into the obtained Kepstrum, whereby exact information is obtained for processing by the data processing apparatus. Thus, improved thickness measuring precision is achieved.

Embodiment 2

While in the above-described first embodiment the precision of thickness measurement is improved by combining the FTIR method with an interference waveform analysis in the optical characteristic matrix analysis, by using those methods with wavenumber characteristic ranges overlapping each other for improved light sources, optical systems, and light detecting parts as shown in FIGS. 12 to 17, respectively, which are disclosed in Japanese Published Patent Application Hei. 5-302816, the optical detection sensitivity of the FTIR method can be increased, whereby the film thickness measurement can be carried out exactly.

Embodiment 3

In the above-described second embodiment the precision of film thickness measurement is improved by combining the FTIR method and the interference waveform analysis employing optical characteristic matrix analysis. As shown in FIG. 10 disclosed in Japanese Published Patent Application Hei. 3-110405, when a photometering light beam that is not collected on a substrate but irradiates the substrate as a parallel light beam is employed to reduce variations in incident angle and variations in the incident plane, that light beam can include exact information of the thin multi-layer film in the obtained Kepstrum, and it is possible to increase the optical detection sensitivity of the FTIR method, thereby performing the thickness measurement accurately.

Embodiment 4

In the above-described second and third embodiments, the spectroscopic apparatus is improved to enhance the precision of the layer thickness measurement. By employing a data processing apparatus that has improved measurement precision by efficiently taking layer thickness information from the reflection interference spectrum of a relatively narrow wavenumber band by Fourier transformation after adding data of a constant value prior to the Fourier transformation as shown in FIGS. 18 to 22 and disclosed in Japanese Published Patent Application Hei. 4-66806, the measuring precision can be further increased.

Embodiment 5

Figure 23:
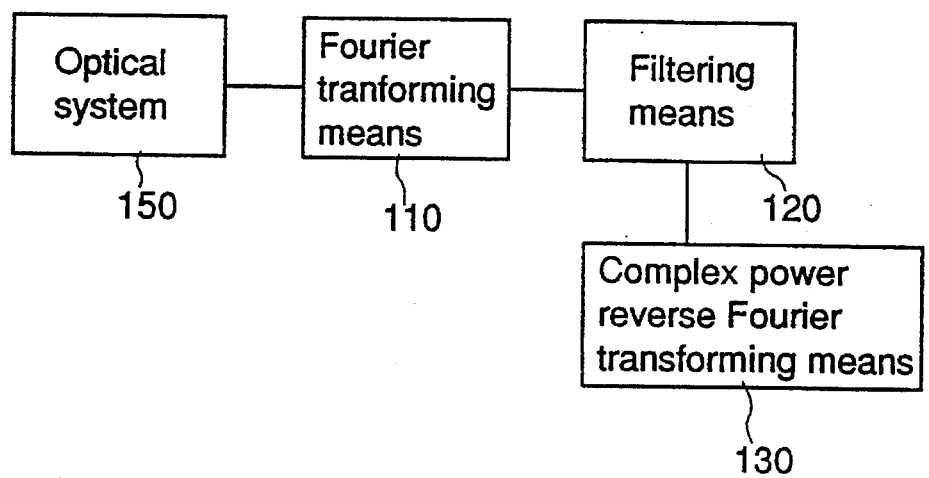
FIG. 23 is a flowchart showing the processing of the data processing apparatus in the semiconductor film thickness measuring apparatus disclosed in Japanese Published Patent Application Hei. 4-120404.
Figure 24:
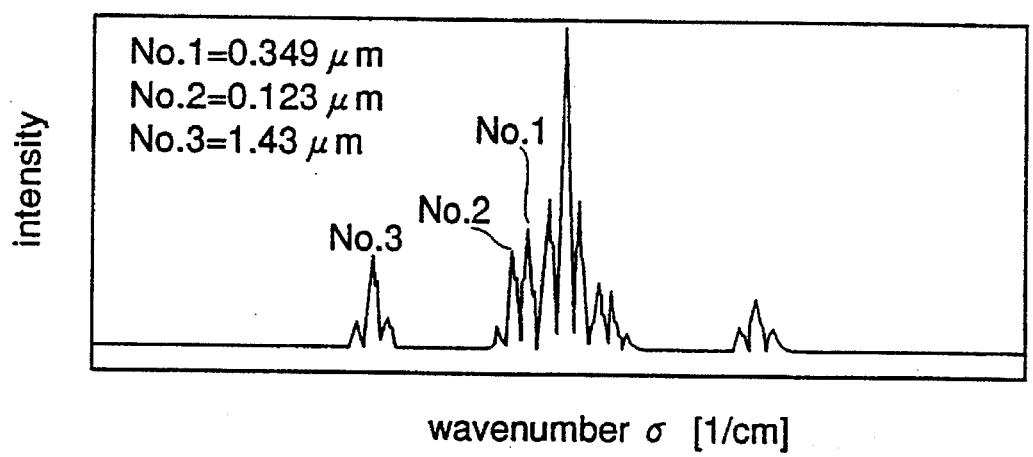
FIG. 24 is a diagram illustrating a space interference waveform obtained by the processing shown in FIG. 23.

In the above-described fourth embodiment the film thickness measurement precision is enhanced by improving the Fourier transformation in the data processing apparatus. By using a transformation that measures the thicknesses of respective layers of much thinner thin multi-layer films exactly and stably at a prescribed photometering wavenumber band by performing a complex power reverse Fourier transformation as a reverse Fourier transformation as shown in FIGS. 23 and 24 which are taken from Japanese Published Patent Application Hei. 4-120404, the measuring precision can be further increased.

Embodiment 6

By performing an interference waveform analysis employing the optical characteristic matrix, combining the improvement of the reverse Fourier transformation processing in the fifth embodiment and the improvement in the interpolation of data in the fourth embodiment or the improvement of the optical system in the second and third embodiments, it is possible to perform thickness measurements having a measurement limit of 0.05+0.01 μm reliably. This limit is one-half of the measuring limitation of 0.1 μm of the prior art method. Accordingly, even when the interference fringe of the thin film part is only included by one-half in this measuring range, a sufficient measurement of thickness of a layer can be performed.

What is claimed is:

1. An apparatus for measuring thicknesses of layers in a thin semiconductor multi-layer film comprising:

a first memory for storing refractive index distribution and wavenumber dispersion data for respective layers of a multi-layer film;

a spectrometer for continuously measuring spectral distribution of light reflected from an underlying layer of the multi-layer film over a range from visible light to far infrared light;

film interference spectrum operating means for eliminating optical transmission characteristics of the spectrometer from the spectral distribution measured by the spectrometer and producing an interference spectrum including only multi-layer film interference components;

a second memory for storing the interference spectrum including only multi-layer film interference components produced by the film interference spectrum operating means;

Spatialgram calculating means for reverse Fourier transforming a wavenumber range of an interference spectrum excluding the optical transmission characteristics of the spectrometer and calculating a Spatialgram;

a third memory for storing the Spatialgram calculated by the Spatialgram calculating means;

layer thickness approximate value calculating means for reading out side burst peaks of the Spatialgram and the refractive index distribution of respective layers stored in the first memory and calculating approximate respective layer thicknesses;

a fourth memory for storing the approximate respective layer thicknesses calculated by the film thickness approximate value calculating means;

theoretical interference spectrum calculating means for obtaining a theoretical interference spectrum from a characteristic matrix calculation based on the approximate layer thicknesses, the refractive index distribution of respective films, and the wavenumber dispersion data stored in the first memory; and recalculating means for comparing the measured interference spectrum with the theoretical interference spectrum, changing the layer thicknesses of the respective layers to lessen differences between the measured interference spectrum and the theoretical interference spectrum and recalculating the theoretical interference spectrum to obtain layer thicknesses of high precision.

2. The apparatus of claim 1 wherein the film interference spectrum operating means supplements a wavenumber range exceeding the range of photometry with a constant value to produce an interference spectrum.

3. The apparatus of claim 1 wherein the Spatialgram calculating means employs a complex power reverse Fourier transformation.

4. A method for measuring the thicknesses of the layers of a thin semiconductor multi-layer film comprising:

storing refractive index distribution and wavenumber dispersion data for respective layers of a multi-layer film;

continuously spectrally analyzing light reflected from an underlying layer of the multi-layer film over a range from visible light to far infrared light with a spectrometer;

producing an interference spectrum by eliminating an optical transmission characteristic of the spectrometer from the spectrally analyzed light, leaving only multi-layer film interference components;

storing the interference spectrum of only the multi-layer interference components;

calculating a Spatialgram from a reverse Fourier transformation for a limited wavenumber range of the interference spectrum from which the optical transmission characteristic has been eliminated;

storing the Spatialgram;

reading out side burst peaks of the Spatialgram and refractive index distribution of respective layers and calculating approximate respective layer thicknesses;

storing the approximate respective layer thicknesses;

calculating a theoretical interference spectrum from a characteristic matrix based on the approximate layer thicknesses, the refractive index distribution, and wavenumber dispersion data of respective layers; and comparing the interference spectrum with the theoretical interference spectrum, changing the layer thicknesses of the respective layers to lessen differences between the measured interference spectrum and the theoretical interference spectrum and recalculating the theoretical interference spectrum to obtain a high precision measurement of the layer thicknesses.

5. The method of claim 4 including producing an interference spectrum by supplementing a wavenumber range exceeding the range of photometry with a constant value.

6. The method of claim 4 including calculating the Spatialgram using a complex power reverse Fourier transformation.

* * * * *